(12) United States Patent
Muto et al.

(10) Patent No.: US 11,143,083 B2
(45) Date of Patent: Oct. 12, 2021

(54) CATALYST WARM-UP PROCESS MONITORING DEVICE, SYSTEM, AND METHOD FOR INTERNAL COMBUSTION ENGINE, DATA ANALYSIS DEVICE, CONTROL DEVICE FOR INTERNAL COMBUSTION ENGINE, AND RECEIVER

(71) Applicant: TOYOTA JIDOSHA KABUSHIKI KAISHA, Toyota (JP)

(72) Inventors: Harufumi Muto, Miyoshi (JP); Akihiro Katayama, Toyota (JP); Yuki Ikejiri, Nishio (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/780,972

(22) Filed: Feb. 4, 2020

(65) Prior Publication Data

US 2020/0263592 A1    Aug. 20, 2020

(30) Foreign Application Priority Data

Feb. 20, 2019  (JP) .............................. JP2019-028475

(51) Int. Cl.
  *F01N 11/00*  (2006.01)
  *F02D 13/02*  (2006.01)
  *F02D 41/00*  (2006.01)
  (Continued)

(52) U.S. Cl.
  CPC ........ *F01N 11/002* (2013.01); *F02D 13/0207* (2013.01); *F02D 41/0065* (2013.01);
  (Continued)

(58) Field of Classification Search
  CPC ...... F01N 11/002; F01N 3/10; F02D 13/0207; F02D 13/0219; F02D 41/0065;
  (Continued)

(56) References Cited

U.S. PATENT DOCUMENTS 6,505,464 B1   1/2003  Isobe et al.
2002/0056268 A1  5/2002  Isobe et al.
(Continued)

FOREIGN PATENT DOCUMENTS

JP    2001-132438 A    5/2001
JP    2001-227378 A    8/2001
(Continued)

*Primary Examiner* — Audrey B. Walter
*Assistant Examiner* — Dapinder Singh
(74) *Attorney, Agent, or Firm* — Oblon, McClelland, Maier & Neustadt, L.L.P.

(57) ABSTRACT

A storage device stores mapping data and association data. The mapping data defines a mapping that outputs an estimated value of the temperature of a catalyst using a warm-up operation amount variable and the previous value of the estimated value as an input. The association data associates the integrated value of an intake air amount of an internal combustion engine from the startup of the engine and the temperature of the catalyst. The execution device repeatedly calculates the estimated value based on the output of the mapping. When the correspondence relationship between the integrated value and the estimated value is different from the correspondence relationship between the integrated value and the temperature of the catalyst in the association data, the warm-up process is determined to have an anomaly.

16 Claims, 12 Drawing Sheets

(51) Int. Cl.
  *F02P 5/04* (2006.01)
  *G07C 5/00* (2006.01)
  *F02D 41/30* (2006.01)
  *F02P 5/15* (2006.01)

(52) U.S. Cl.
  CPC .......... *F02D 41/3094* (2013.01); *F02P 5/045* (2013.01); *F02P 5/15* (2013.01); *F02D 2200/04* (2013.01); *F02D 2200/0802* (2013.01); *G07C 5/008* (2013.01)

(58) Field of Classification Search
  CPC ............. F02D 41/3094; F02D 41/1405; F02D 41/0072; F02D 41/0055; F02D 41/22; F02D 41/0255; F02D 41/0002; F02D 41/024; F02D 41/1401; F02D 41/0077; F02D 2200/04; F02D 2200/0802; F02D 2200/703; F02D 2200/0804; F02D 2041/1409; F02P 5/045; F02P 5/15; G07C 5/0808; G07C 5/008; Y02T 10/12; Y02T 10/40
  USPC .................................. 60/274, 277, 286, 295
  See application file for complete search history.

(56) References Cited

U.S. PATENT DOCUMENTS

| | | |
|---|---|---|
| 2002/0056272 A1 | 5/2002 | Isobe et al. |
| 2006/0025966 A1 | 2/2006 | Kanamaru |
| 2015/0275806 A1* | 10/2015 | Genslak .................. F02D 28/00 701/104 |
| 2017/0284269 A1 | 10/2017 | Myojo et al. |
| 2018/0038257 A1* | 2/2018 | Uhrich ...................... F01N 5/02 |
| 2018/0163651 A1* | 6/2018 | Lee .......................... F01N 3/101 |
| 2018/0179972 A1 | 6/2018 | Nose et al. |

FOREIGN PATENT DOCUMENTS

| | | |
|---|---|---|
| JP | 2005-188501 A | 7/2005 |
| JP | 2006-037921 A | 2/2006 |
| JP | 2007-32316 A | 2/2007 |
| JP | 2010-209686 A | 9/2010 |
| JP | 2012-26302 A | 2/2012 |
| JP | 2017-186931 A | 10/2017 |
| JP | 2018-105234 A | 7/2018 |

* cited by examiner

CATALYST WARM-UP PROCESS MONITORING DEVICE, SYSTEM, AND METHOD FOR INTERNAL COMBUSTION ENGINE, DATA ANALYSIS DEVICE, CONTROL DEVICE FOR INTERNAL COMBUSTION ENGINE, AND RECEIVER

BACKGROUND

1. Field

The following description relates to a catalyst warm-up process monitoring device, system, and method for an internal combustion engine. The following description further relates to a data analysis device, a control device for internal combustion engine, and a receiver.

2. Description of Related Art

Japanese Laid-Open Patent Publication No. 2007-32316 describes an example of a device that performs a catalyst warm-up process by retarding the ignition timing. In this device, the terminating condition of the warm-up process is set based on the detection value of an oxygen sensor arranged downstream of the catalyst, the temperature of the coolant of the internal combustion engine, and the like.

Even if a control logic for executing the warm-up process is installed in the control device, the catalyst cannot be warmed up within the planned period if any anomaly occurs in the control logic or the like. In such a case, the exhaust may not be processed in the intended manner after the cold start of the internal combustion engine.

SUMMARY

Hereinafter, examples of the present disclosure will be described.

Example 1

A catalyst warm-up process monitoring device for an internal combustion engine includes an execution device and a storage device. The catalyst warm-up process monitoring device is applied to an internal combustion engine in which a catalyst is arranged in an exhaust passage. The storage device is configured to store mapping data and association data. The mapping data defines a mapping that outputs an estimated value of a temperature of the catalyst using a warm-up operation amount variable and a previous value of an estimated value of a temperature of the catalyst as an input. The warm-up operation amount variable is a variable related to an operation amount of an operation unit of the internal combustion engine that is used for a warm-up process of the catalyst. The association data associates an integrated value of an intake air amount of the internal combustion engine from the startup of the internal combustion engine and the temperature of the catalyst with each other. The execution device is configured to execute a warm-up process, an integrating process for calculating the integrated value, an acquiring process for acquiring the warm-up operation amount variable and the previous value of the estimated value of the temperature of the catalyst, a temperature calculation process for repeatedly calculating the estimated value of the temperature of the catalyst based on the output of the mapping in which the warm-up operation amount variable acquired by the acquiring process and the previous value are the input to the mapping, a determination process for determining that the warm-up process has an anomaly when a correspondence relationship between the integrated value and the estimated value is different from a correspondence relationship between the integrated value and the temperature of the catalyst in the association data, and a coping process for coping with the anomaly by operating a predetermined hardware when determined that the anomaly has occurred.

The integrated value has a correlation with the total amount of combustion energy in the internal combustion engine. Thus, the temperature of the catalyst can be recognized by the integrated value. Furthermore, since the warm-up control of the catalyst is determined by the warm-up operation amount variable, the temperature of the catalyst can be recognized also by the warm-up operation amount variable. For these reasons, in the above configuration, when the estimated value of the catalyst temperature calculated based on the warm-up operation amount variable does not match the association data that associates the integrated value with the temperature of the catalyst with each other, determination is made that there is an anomaly in the warm-up process. Thus, when there is an anomaly in the warm-up process, it can be detected that the exhaust characteristic after the cold start of the internal combustion engine is lower than the assumed characteristics, and furthermore when the exhaust characteristic after the cold start of the internal combustion engine falls below the assumed characteristics, it can be dealt.

Example 2

The catalyst warm-up process monitoring device according to example 1 in which the internal combustion engine includes a valve characteristic varying device configured to vary the valve characteristic of an intake valve. The input to the mapping includes a valve characteristic variable that is a variable related to the valve characteristic. The acquiring process includes a process for acquiring the valve characteristic variable. The temperature calculation process is a process for calculating the estimated value based on the output of the mapping in which the valve characteristic variable is further included in the input to the mapping.

The combustion temperature of the air-fuel mixture in the combustion chamber is change by the valve characteristic variable. Furthermore the temperature of the exhaust gas discharged to the exhaust passage changes. Thus, according to the configuration described above, the estimated value of the temperature of the catalyst can be calculated with higher accuracy by having the valve characteristic variable as an input to the mapping.

Example 3

The catalyst warm-up process monitoring device according to example 1 or 2 in which the warm-up operation amount variable includes an ignition variable that is a variable related to ignition timing.

In the configuration described above, the temperature of the exhaust gas can be increased by altering the ignition timing, and furthermore, the catalyst can be warmed up. Furthermore, in the configuration described above, the estimated value of the temperature of the catalyst can be calculated while grasping the raising degree of the temperature of the exhaust gas by the operation of the ignition timing from the ignition variable.

Example 4

The catalyst warm-up process monitoring device according to example 3 in which the input to the mapping includes an injection amount variable that is a variable related to a fuel injection amount. The acquiring process includes a process for acquiring the injection amount variable. The temperature calculation process is a process for calculating the estimated value based on the output of the mapping in which the injection amount variable is further included in the input to the mapping.

At the cold start of the internal combustion engine and the like, there is a tendency to increase the actual injection amount with respect to the fuel amount at which the air-fuel ratio is the target air-fuel ratio at the normal time for the purpose of avoiding misfire, and the like. In this case, the actual air-fuel ratio is not only richer than the target air-fuel ratio at the normal time, but the enrichment degree may not be constant. Thus, the combustion temperature may change and, furthermore, the temperature of the catalyst may change when a predetermined air-fuel ratio is assumed. Therefore, in the above configuration, the injection amount variable is included in the input of the mapping. Thus, even when the fuel amount is increased, the temperature of the catalyst can be estimated by reflecting the influence of the case.

Example 5

The catalyst warm-up process monitoring device according to any one of examples 1 to 4 in which the warm-up process includes a dither control process for operating a fuel injection valve serving as the operation unit so that some of a plurality of cylinders of the internal combustion engine are set as rich combustion cylinders and cylinders differing from the some of a plurality of cylinders are set as lean combustion cylinders. An air-fuel ratio in the rich combustion cylinder is richer than a stoichiometric air-fuel ratio, and an air-fuel ratio in the lean combustion cylinders is leaner than the stoichiometric air-fuel ratio. The warm-up operation amount variable that is the input to the mapping includes an amplitude value variable. The amplitude value variable is a variable related to an enrichment degree of the air-fuel ratio of the rich combustion cylinder with respect to the stoichiometric air-fuel ratio and a leaning degree of the air-fuel ratio of the lean combustion cylinder with respect to the stoichiometric air-fuel ratio.

In the above configuration, the catalyst can be warmed up by the oxidation reaction between the oxygen discharged from the lean combustion cylinder and the fuel discharged from the rich combustion cylinder. At this time, the temperature rise of the catalyst depends on the difference between the air-fuel ratio of the rich combustion cylinder and the air-fuel ratio of the lean combustion cylinder. Therefore, in the above configuration, the temperature of the catalyst can be calculated with high accuracy by having the amplitude value variable as the warm-up operation amount variable and the amplitude value variable as an input to the mapping.

Example 6

The catalyst warm-up process monitoring device according to any one of examples 1 to 5 in which the internal combustion engine includes a port injection valve that injects fuel into an intake passage and an in-cylinder injection valve that injects fuel into a combustion chamber of the internal combustion engine. The input to the mapping includes an injection sharing variable that is a variable related to an injection sharing ratio. The injection sharing ratio is a ratio of the amount of fuel injected from the port injection valve to the sum of the amount of fuel injected from the port injection valve and the amount of fuel injected from the in-cylinder injection valve. The acquiring process includes a process for acquiring the injection sharing variable. The temperature calculation process is a process for calculating the estimated value based on the output of the mapping in which the injection sharing variable is further included in the input to the mapping.

In the above configuration, the injection sharing variable is included in the input to the mapping. Thus, the estimated value that reflects the difference in combustion between when the fuel is injected from the port injection valve and when the fuel is injected from the in-cylinder injection valve can be calculated.

Example 7

The catalyst warm-up process monitoring device according to any one of examples 1 to 6 in which the internal combustion engine includes an EGR passage, which is configured to cause a fluid entering the exhaust passage from the combustion chamber of the internal combustion engine to flow into the intake passage, and an EGR valve, which is configured to adjust a flow path cross-sectional area of the EGR passage. The input to the mapping includes an EGR variable that is a variable indicating an EGR ratio. The EGR ratio is a ratio of the amount of the fluid entering the intake passage through the EGR passage to the sum of the amount of air drawn into the intake passage and the amount of the fluid entering the intake passage through the EGR passage. The acquiring process includes a process for acquiring the EGR variable. The temperature calculation process is a process for calculating the estimated value based on the output of the mapping in which the EGR variable is further included in the input to the mapping.

In the above configuration, the EGR variable is included in the input to the mapping. Thus, the estimated value that reflects the difference in the temperature of the exhaust gas discharged to the exhaust passage as the combustion is different when the EGR ratio is different can be calculated.

Example 8

The catalyst warm-up process monitoring device according to any one of examples 1 to 7 in which the input to the mapping includes an atmospheric pressure variable that is a variable related to atmospheric pressure. The acquiring process includes a process for acquiring the atmospheric pressure variable. The temperature calculation process is a process for calculating the estimated value based on the output of the mapping in which the atmospheric pressure variable is further included in the input to the mapping.

In the above configuration, the atmospheric pressure variable is included in the input to the mapping. Thus, the estimated value that reflects the difference in combustion according to atmospheric pressure can be calculated.

Example 9

The catalyst warm-up process monitoring device according to any one of examples 1 to 8 in which liquid, of which flow rate s adjusted by an adjusting device, flows to the internal combustion engine. The input to the mapping includes a flow rate variable that is a variable related to the flow rate of the liquid. The acquiring process includes a process for acquiring the flow rate variable. The temperature calculation process is a process for calculating the estimated value based on the output of the mapping in which the flow rate variable is further included in the input to the mapping.

In the above configuration, a flow rate variable is included in the input to the mapping. Thus, an estimated value that reflects the change in the temperature of each part of the internal combustion engine due to heat exchange between the liquid and the internal combustion engine can be calculated.

Example 10 The catalyst warm-up process monitoring device according to any one of examples 1 to 9 in which the catalyst is divided into N partial regions arranged in a flow direction of the fluid flowing into the catalyst. The N partial regions include a first partial region to an $N^{th}$ partial region in order from an upstream side of the catalyst. The acquiring process includes a process for acquiring a previous value of an estimated value of each temperature from the first partial region to the $N^{th}$ partial region as the previous value of the estimated value. The mapping includes a first mapping and an $i^{th}$ mapping as a mapping that outputs the estimated value of the temperature of the first partial region. Among the variables acquired by the acquiring process, the first mapping uses a variable other than an estimated value of a temperature of the partial region located downstream of the first partial region at least as the input, where "i" is an integer greater than or equal to 2 and less than or equal to N. The $i^{th}$ mapping is a mapping that outputs the estimated value of the temperature of the $i^{th}$ partial region and at least the estimated value of a temperature of an "i−1"$^{th}$ partial region and a previous value of an estimated value of the temperature of the $i^{th}$ partial region are used as the inputs. The temperature calculation process includes a process for calculating an estimated value of each temperature from the first partial region to the $N^{th}$ partial region performed through a process for calculating the estimated value of the temperature of the first partial region by inputting to at least the first mapping a variable other than the estimated value of the temperature of the partial region located downstream of the first partial region among the variables acquired by the acquiring process, and a process for calculating the estimated value of the temperature of the $i^{th}$ partial region by using at least the estimated value of the temperature of the "i−1"$^{th}$ partial region and the previous value of the estimated value of the temperature of the $i^{th}$ partial region as the input to the $i^{th}$ mapping.

In the above configuration, the temperature of the $i^{th}$ partial region is estimated based on the estimated value of the temperature of the "i−1"$^{th}$ partial region. Thus, the temperature of the $i^{th}$ partial region can be estimated in consideration of the heat exchange between the $i^{th}$ partial region and the "i−1"$^{th}$ partial region. Therefore, for example, heat exchange between partial regions of the catalyst can be easily reflected as compared with a case where a mapping for calculating the temperature of a single catalyst is formed by a single mapping. Thus, the estimation accuracy of the temperature can be enhanced while simplifying the structure of each mapping.

Example 11

The catalyst warm-up process monitoring device according to any one of examples 1 to 9 in which the mapping includes a steady mapping and a time constant mapping. The steady mapping uses the warm-up operation amount variable as the input and outputs a steady temperature that is a value at which the temperature of the catalyst converges when the internal combustion engine is performing a steady operation. The time constant mapping uses an air amount variable, the steady temperature, and the previous value of the estimated value as an input, and outputs a time constant variable. The air amount variable is a variable related to the intake air amount of the internal combustion engine, and the time constant variable is a variable defining a time constant for the current temperature to converge to the steady temperature. The acquiring process includes a process for acquiring the air amount variable. The temperature calculation process includes a steady calculation process that uses the warm-up operation amount variable as the input and calculates the steady temperature based on the output of the steady mapping, a time constant calculation process that uses the air amount variable, the steady temperature, and the previous value of the estimated value as the input and calculates the time constant variable based on the output of the time constant mapping, and a process that calculates the estimated value by approximating the estimated value of the temperature of the catalyst to the steady temperature in correspondence with the time constant variable calculated by the time constant calculation process.

In the above configuration, the transient behavior of the temperature of the catalyst can also be estimated from the steady state temperature and the time constant variable.

Example 12 The catalyst warm-up process monitoring device according to any one of examples 1 to 11 in which the coping process includes a notification process for issuing a notification that the warm-up process has an anomaly by operating a notification device as the predetermined hardware.

In the above configuration, it is possible to urge the user to deal with the anomaly in the warm-up process by the notification process.

Example 13

A catalyst warm-up process monitoring system for an internal combustion engine includes the execution device and the storage device recited in any one of examples 1 to 12. The execution device includes a first execution device and a second execution device. The first execution device is mounted on a vehicle and configured to execute the acquiring process, a vehicle-side transmitting process for transmitting data acquired by the acquiring process to outside the vehicle, a vehicle-side receiving process for receiving a signal based on an estimated value calculated by the temperature calculation process, and the coping process. The second execution device is disposed outside the vehicle and configured to execute an external-side receiving process for receiving the data transmitted by the vehicle-side transmitting process, the temperature calculation process, and an external-side transmitting process for transmitting a signal based on the estimated value calculated by the temperature calculation process to the vehicle.

In the above configuration, the calculation load of the in-vehicle device can be reduced by executing the temperature calculation process outside the vehicle.

Example 14

A data analysis device includes the second execution device and the storage device recited in example 13.

Example 15

A control device for an internal combustion engine includes the first execution device recited in example 13.

Example 16

A receiver that is hardware configuring a part of the catalyst warm-up process monitoring system according to example 13. The receiver is configured to execute the vehicle-side receiving process.

Example 17

A method for monitoring a catalyst warm-up process for an internal combustion engine is executed through the processes recited in any one of examples 1 to 16.

Example 18

The processes recited in any one of examples 1 to 16 are embodied as a non-transitory computer-readable recording medium storing a program executed by a processor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of a catalyst warm-up process monitoring device for an internal combustion engine will now be described with reference to FIGS. 1 to 7.

Figure 1:
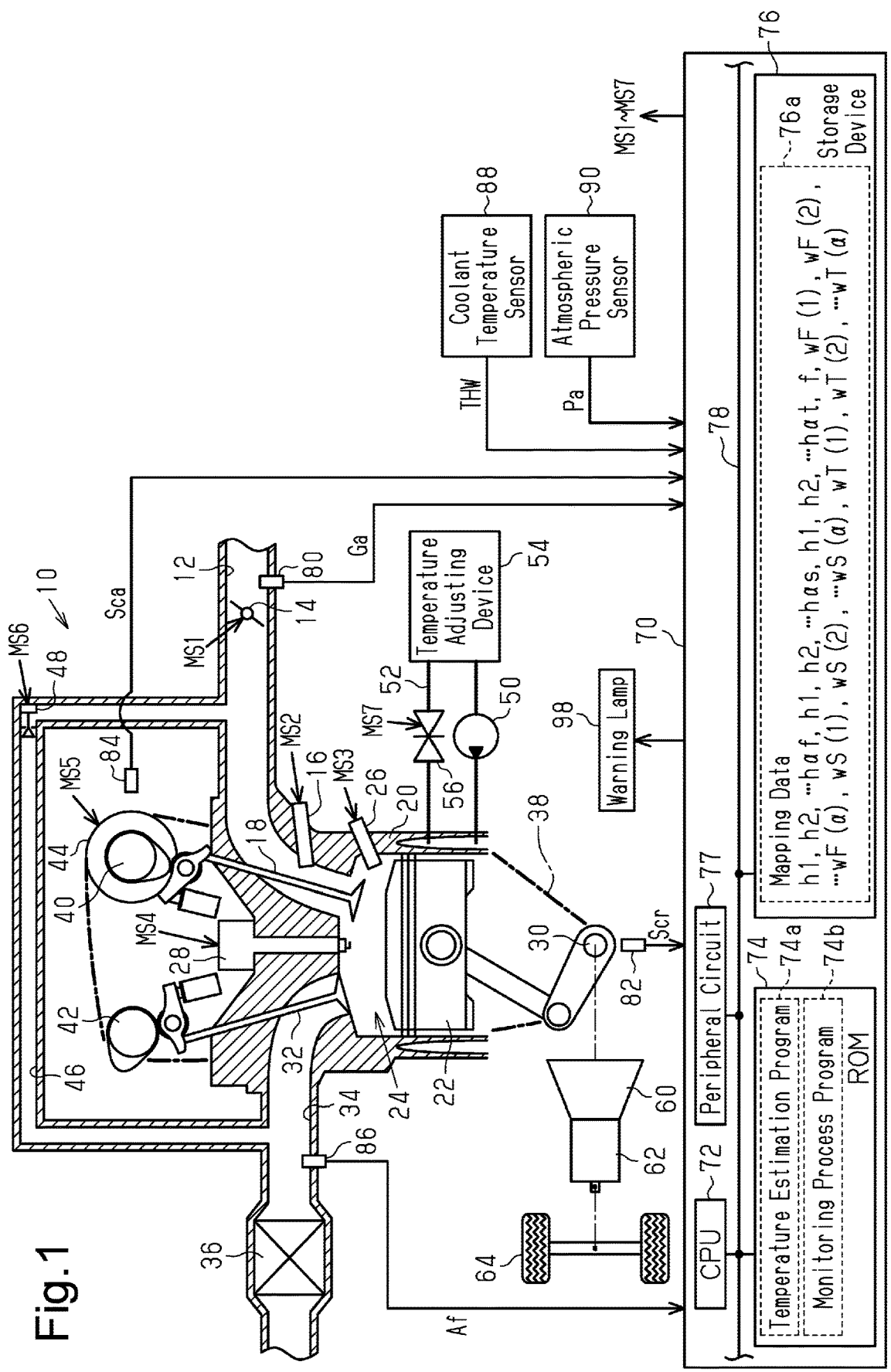
FIG. 1 is a diagram showing the configuration of a control device and a drive system of a vehicle according to a first embodiment.

A throttle valve 14 and a port injection valve 16 are arranged in order from an upstream side in an intake passage 12 of the internal combustion engine 10 shown in FIG. 1. Air drawn into the intake passage 12 and fuel injected from the port injection valve 16 flow into a combustion chamber 24 defined by a cylinder 20 and a piston 22 when an intake valve 18 opens. An in-cylinder injection valve 26 injects fuel into the combustion chamber 24. In the combustion chamber 24, the air-fuel mixture is burned by a spark discharge of an ignition device 28. The piston 22 converts the combustion energy generated by the combustion to rotational energy of a crankshaft 30. The burned air-fuel mixture is discharged to an exhaust passage 34 as exhaust gas when an exhaust valve 32 opens. The exhaust passage 34 includes a catalyst 36 such as a three-way catalyst having an oxygen storage capacity.

The rotational power of the crankshaft 30 is transmitted to an intake side camshaft 40 and an exhaust side camshaft 42 by a timing chain 38. In the present embodiment, the power of the timing chain 38 is transmitted to the intake side camshaft 40 by a variable valve timing device 44. The variable valve timing device 44 is an actuator that adjusts the valve opening timing of the intake valve 18 by adjusting the rotational phase difference between the crankshaft 30 and the intake side camshaft 40.

Furthermore, a downstream portion of the throttle valve 14 in the intake passage 12 is connected to the exhaust passage 34 through an EGR passage 46. The EGR passage 46 includes an EGR valve 48 for adjusting the flow path cross-sectional area.

Furthermore, the power of the pump 50 sends the coolant in the internal combustion engine 10 through a coolant circulation path 52 to, for example, a device for adjusting the temperature of the hydraulic fluid of a transmission 62, a temperature adjusting device 54 such as a heater, and the like. After exchanging heat exchange, the coolant flows into the internal combustion engine 10 again. The circulation amount of the coolant in the coolant circulation path 52 is adjusted by a flow rate control valve 56 that adjusts the flow path cross-sectional area of the coolant circulation path 52.

Drive wheels 64 are mechanically connected to the crankshaft 30 by a torque converter 60 and the transmission 62.

The control device 70 controls the internal combustion engine 10 and operates operation units of the internal combustion engine 10 such as the throttle valve 14, the port injection valve 16, the in-cylinder injection valve 26, the ignition device 28, the variable valve timing device 44, the EGR valve 48, and the flow rate control valve 56 to control the torque, exhaust component ratio, and the like, which are control amounts, of the internal combustion engine 10. FIG. 1 shows operation signals MS1 to MS7 of each of the throttle valve 14, the port injection valve 16, the in-cylinder injection valve 26, the ignition device 28, the variable valve timing device 44, the EGR valve 48, and the flow rate control valve 56.

When controlling the control amount, the control device 70 refers to an intake air amount Ga detected by an air flow meter 80, an output signal Scr of a crank angle sensor 82, an output signal Sca of an intake side cam angle sensor 84, and an air-fuel ratio Af detected by an air-fuel ratio sensor 86 arranged upstream of the catalyst 36. Furthermore, the control device 70 refers to the temperature of the coolant (coolant temperature THW) of the internal combustion engine 10 detected by a coolant temperature sensor 88 and an atmospheric pressure Pa detected by an atmospheric pressure sensor 90.

The control device 70 includes a CPU 72, a ROM 74, a storage device 76 which is an electrically rewritable non-volatile memory, and a peripheral circuit 77, which can communicate with each other through a local network 78. The peripheral circuit 77 includes a circuit that generates a clock signal defining an internal operation, a power supply circuit, a reset circuit, and the like.

The control device 70 controls the control amount by executing a program stored in the ROM 74 with the CPU 72.

Figure 2:
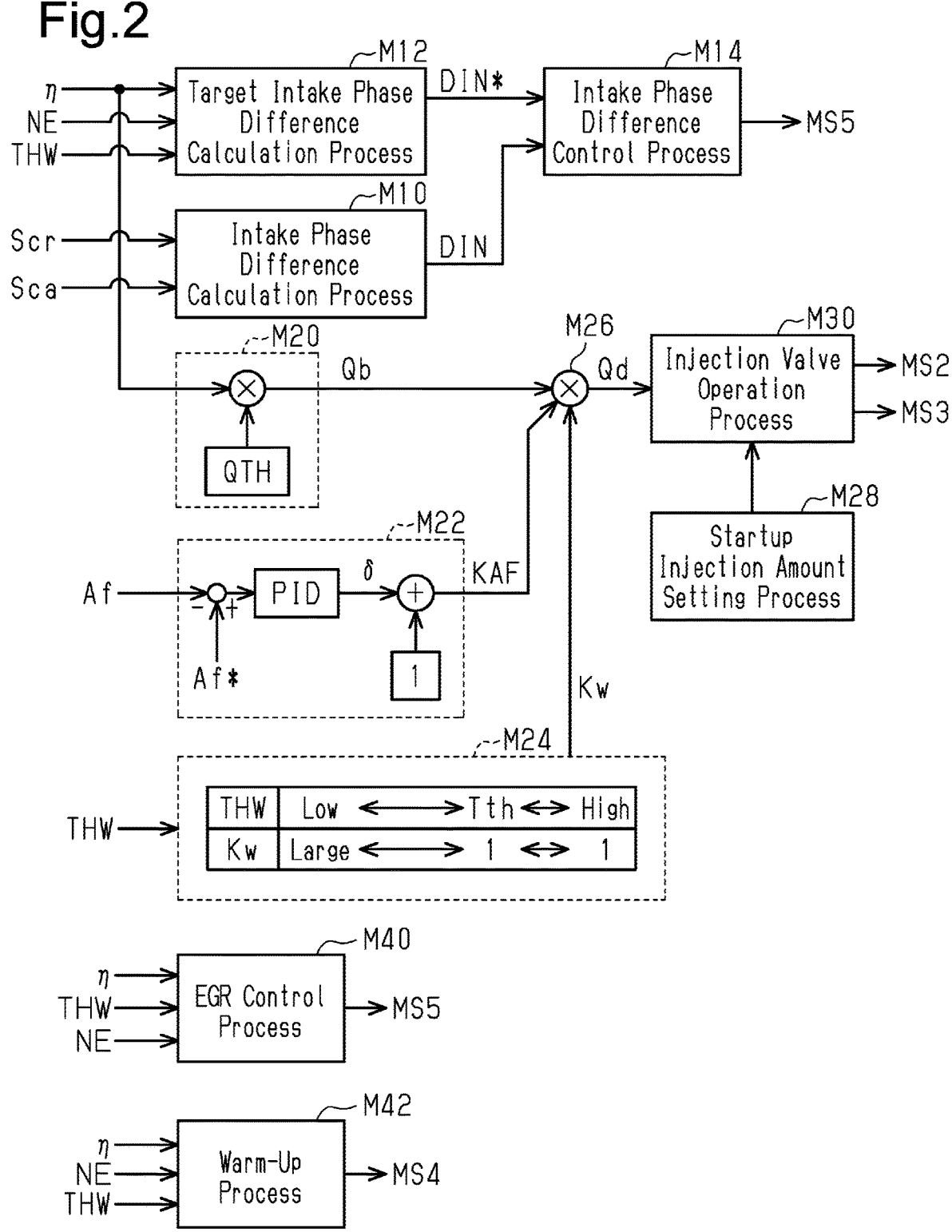
FIG. 2 is a block diagram showing part of a process executed by the control device according to the first embodiment.

FIG. 2 shows part of the process performed by the CPU 72 when executing a program stored in the ROM 74.

An intake phase difference calculation process M10 is a process for calculating an intake phase difference DIN which is a phase difference of a rotational angle of the intake side camshaft 40 from the rotational angle of the crankshaft 30 based on the output signal Scr of the crank angle sensor 82 and the output signal Sca of the intake side cam angle sensor 84. A target intake phase difference calculation process M12 is a process for variably setting a target intake phase difference DIN* based on an action point of the internal combustion engine 10. In the present embodiment, the action point is defined by the rotation speed NE and the filling efficiency η. The CPU 72 calculates the rotation speed NE based on the output signal Scr of the crank angle sensor 82, and calculates the filling efficiency η based on the rotation speed NE and the intake air amount Ga. The filling efficiency η is a parameter that defines the amount of air filled in the combustion chamber 24. When the coolant temperature THW is less than a specific temperature, the intake phase difference calculation process M10 includes a process for changing the actual target intake phase difference DIN* from the target intake phase difference DIN* corresponding to the action point.

An intake phase difference control process M14 is a process for outputting an operation signal MS5 to the variable valve timing device 44 to operate the variable valve timing device 44 so as to control the intake phase difference DIN to the target intake phase difference DIN*.

A base injection amount calculation process M20 is a process for calculating a base injection amount Qb based on the filling efficiency η. The base injection amount Qb is a base value of a fuel amount of for setting the air-fuel ratio of the air-fuel mixture in the combustion chamber 24 to the target air-fuel ratio. Specifically, when the filling efficiency η is expressed as a percentage, for example, the base injection amount calculation process M20 may be a process for calculating the base injection amount Qb by multiplying the fuel amount QTH per 1% of the filling efficiency η for setting the air-fuel ratio to the target air-fuel ratio by the filling efficiency η. The base injection amount Qb is a fuel amount calculated to control the air-fuel ratio to the target air-fuel ratio based on the amount of air filled in the combustion chamber 24. In the present embodiment, a stoichiometric air-fuel ratio is illustrated as a target air-fuel ratio.

A feedback process M22 is a process for calculating and outputting a feedback correction coefficient KAF obtained by adding "1" to a correction ratio δ of the base injection amount Qb. The correction ratio δ of the base injection amount Qb is a feedback operation amount which is an operation amount for feedback controlling an air-fuel ratio Af to a target value Af*. Specifically, the feedback process M22 sets a sum of each output value of a proportional element and a differentiation element, having the difference between the air-fuel ratio Af and the target value Af* as the input, and an output value of an integral element that holds and outputs an integrated value of a value corresponding to the difference as a correction ratio δ.

A low temperature correcting process M24 is a process for calculating a low temperature increase coefficient Kw to a value larger than "1" in order to increase the base injection amount Qb when the coolant temperature THW is lower than a predetermined temperature Tth (e.g., 60° C.) Specifically, the low temperature increase coefficient Kw is calculated to a larger value when the coolant temperature THW is low than when the coolant temperature THW is high. When the coolant temperature THW is higher than or equal to the predetermined temperature Tth, the low temperature increase coefficient Kw is set to "1", and the correction amount of the base injection amount Qb obtained by the low temperature increase coefficient Kw is set to zero.

A startup injection amount setting process M28 is a process of Setting the injection amount at the startup of the internal combustion engine 10. The startup injection amount setting process M28 is a process of Setting the injection amount to inject a greater fuel amount than the amount of fuel necessary so that the air-fuel ratio of the air-fuel mixture combusted in the combustion chamber 24 becomes equal to the stoichiometric air-fuel ratio, particularly, from the viewpoint of reducing misfire, and the like at the startup of the internal combustion engine 10.

An injection valve operation process M30 is a process for outputting an operation signal MS2 to the port injection valve 16 to operate the port injection valve 16, or outputting an operation signal MS3 to the in-cylinder injection valve 26 to operate the in-cylinder injection valve 26. Specifically, the injection valve operation process M30 is a process of Setting the injection ratio of the port injection valve 16 with respect to the required injection amount Qd as the injection sharing ratio Kp, and operating the port injection valve 16 and the in-cylinder injection valve 26 according to the injection sharing ratio Kp after the startup of the internal combustion engine 10. Furthermore, the injection valve operation process M30 is a process for operating the port injection valve 16 so that the port injection valve 16 injects the fuel of the fuel amount set by the startup injection amount setting process M28 at the startup of the internal combustion engine 10.

An EGR control process M40 is basically a process for operating the EGR valve 48 to control the EGR ratio Regr based on the rotation speed NE and the filling efficiency η that define the action point of the internal combustion engine 10. The EGR ratio is a ratio of the amount of air flowing into the intake passage 12 through the EGR passage 46 to the sum of the flow rate of air drawn into the intake passage 12 and the amount of fluid flowing into the intake passage 12 through the EGR passage 46. The EGR control process M40 includes a process for controlling the EGR ratio Regr so as to deviate from the EGR ratio Regr determined from the action point when the coolant temperature THW is low, and the like.

A warm-up process M42 retards the ignition timing by a predetermined amount with respect to the normal base ignition timing determined from the rotation speed NE and the filling efficiency η at the cold start of the internal combustion engine 10. This increases the amount of heat that does not contribute to torque produced from the combustion energy of air-fuel mixture. Specifically, the warm-up process M42 is a process for retarding the ignition timing during a cold start when the coolant temperature THW at the startup is lower than or equal to the specified temperature.

At the cold start of the internal combustion engine 10, the CPU 72 executes a process for monitoring whether or not the process for warming up the catalyst 36 is normally performed by the process shown in FIG. 2. This will be described in detail below.

Figure 3:
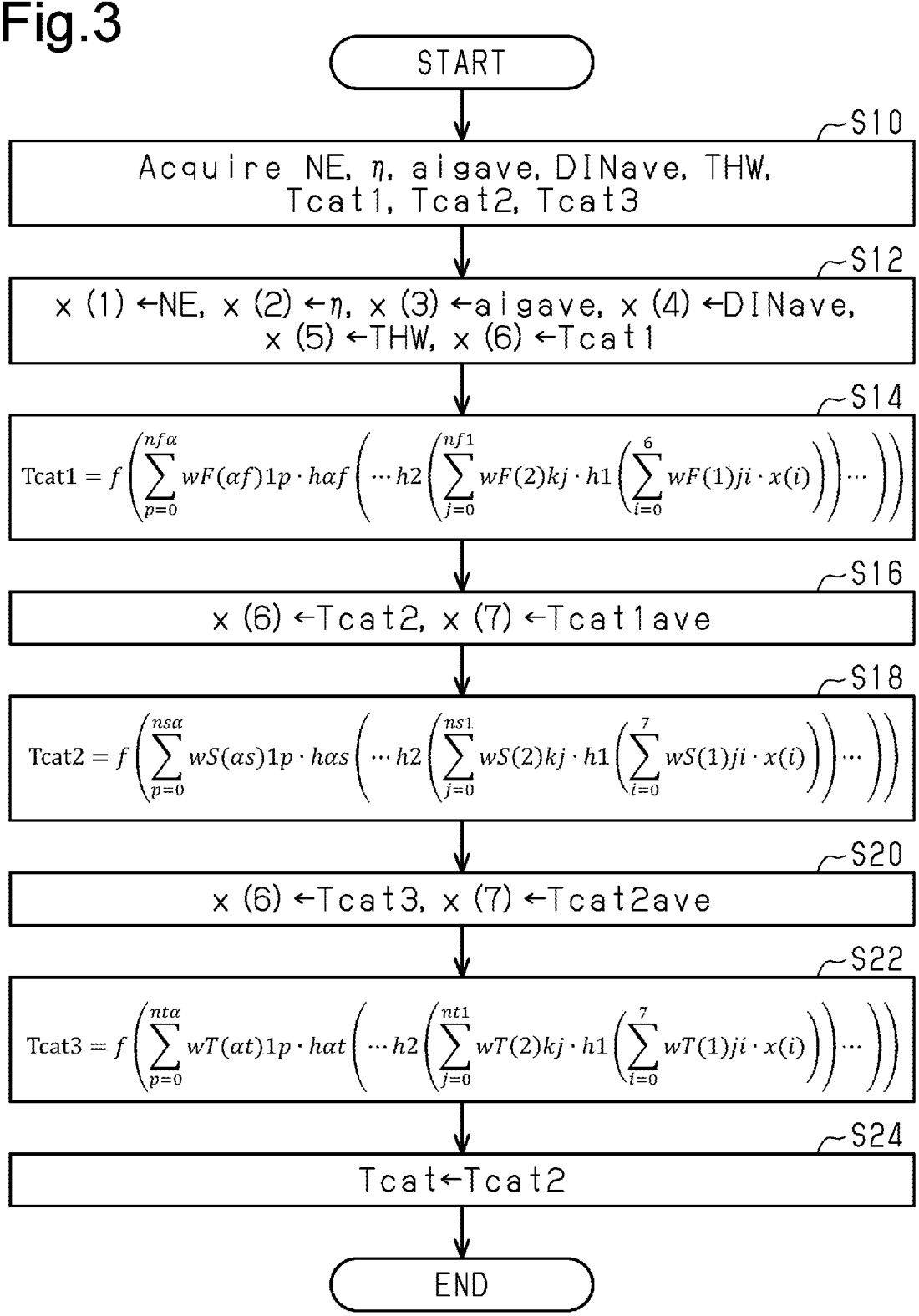
FIG. 3 is a flowchart showing a catalyst temperature estimation process according to the first embodiment.

FIG. 3 shows an estimation process for the temperature of the catalyst 36. The process shown in FIG. 3 is implemented by the CPU 72 repeatedly executing the temperature estimation program 74a stored in the ROM 74 shown in FIG. 1 in predetermined cycles, for example, during the cold start of the internal combustion engine 10. Hereinafter, the step number of each process is represented by "S" followed by a numeral.

Figure 4:
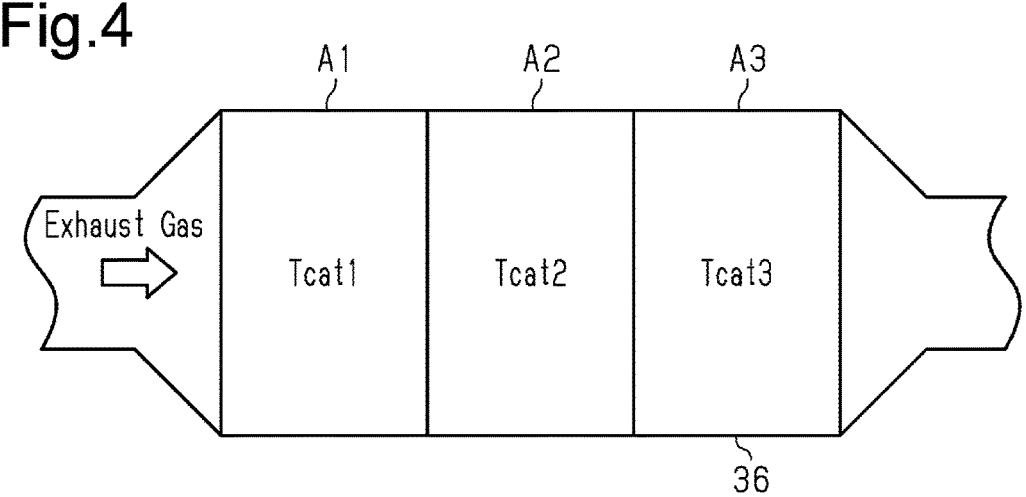
FIG. 4 is a diagram showing a partial region of the catalyst according to the first embodiment.

In the series of processes shown in FIG. 3, the CPU 72 first acquires the rotation speed NE, the filling efficiency η, the ignition timing average value aigave, the intake phase difference average value DINave, the coolant temperature THW, the previous value of the first temperature Tcat1, the previous value of the second temperature Tcat2, and the previous value of the third temperature Tcat3 (S10). Here, the ignition timing average value aigave and the intake phase difference average value DINave are the average value of the ignition timing aig and the average value of the intake phase difference DIN, respectively, in the processing cycle of S10. Furthermore, as shown in FIG. 4, when the region from the upstream side to the downstream side of the catalyst 36 is divided into three partial regions, the first temperature Tcat1, the second temperature Tcat2, and the third temperature Tcat3 are temperatures of each partial region, which are a first partial region A1, a second partial region A2, and a third partial region A3 in order from the upstream side. The previous value is a value calculated at the previous execution of the series of processes shown in FIG. 3.

Next, the CPU 72 substitutes the values of variables other than the second temperature Tcat2 and the third temperature Tcat3 among the variables acquired in the process of S10 to the input variable of the mapping that outputs the first temperature Tcat1 (S12). That is, the CPU 72 substitutes the rotation speed NE to the input variable $x(1)$, substitutes the filling efficiency η to the input variable $x(2)$, substitutes the ignition timing average value aigave to the input variable $x(3)$, and substitutes the intake phase difference average value DINave to the input variable $x(4)$. Furthermore, the CPU 72 substitutes the coolant temperature THW to the input variable $x(5)$, and substitutes the previous value of the first temperature Tcat1 to the input variable $x(6)$.

Next, the CPU 72 calculates the first temperature Tcat1 by inputting the input variables $x(1)$ to $x(6)$ to the mapping that outputs the first temperature Tcat1 (S14). This mapping is formed by a neural network having an "αf" number of intermediate layers, and in which the activation functions h1 to hαf of each intermediate layer are hyperbolic tangent, and the activation function f of the output layer is ReLU. ReLU is a function that outputs the one of the input and zero that is not smaller. In other words, when the input is not zero, ReLU is a function that outputs the larger one of the input and zero, and when the input is zero, ReLU is a function that outputs zero.

For example, the value of each node in the first intermediate layer is generated by inputting, to the activation function h1, the output when the input variables $x(1)$ to $x(6)$ are input to the linear mapping defined by the coefficient $wF(1)ji$ (j=0 to nf1, i=0 to 6). That is, when m=1, 2, ..., αf is satisfied, the value of each node in the $m^{th}$ intermediate layer is generated by inputting, to the activation function hm, the output of the linear mapping defined by the coefficient $wF(m)$. Here, nf1, nf2, ..., nfα are the number of nodes in the first, second, ..., $αf^{th}$ intermediate layer. Here, $wF(1)j0$ and the like are bias parameters, and the input variable $x(0)$ is defined as "1".

Next, the CPU 72 generates input variables $x(1)$ to $x(7)$ of the mapping that outputs the second temperature Tcat2 (S16). Here, the input variables $x(1)$ to $x(5)$ are the same as those generated in the process of S12. The CPU 72 substitutes the previous value of the second temperature Tcat2 to the input variable $x(6)$, and substitutes the first temperature average value Tcat1ave to the input variable $x(7)$. The first temperature average value Tcat1ave is an average value of the most recent plurality of sampling values of the first temperature Tcat1, including the current value of the first temperature Tcat1, which is the first temperature Tcat1 calculated by the current process of S14.

Next, the CPU 72 calculates the second temperature Tcat2 by inputting the input variables $x(1)$ to $x(7)$ to the mapping that outputs the second temperature Tcat2 (S18). This mapping is formed by a neural network having an "as" number of intermediate layers, and in which the activation functions h1 to has of each intermediate layer are hyperbolic tangent, and the activation function f of the output layer is ReLU. For example, the value of each node in the first intermediate layer is generated by inputting, to the activation function h1, the output when the input variables $x(1)$ to $x(7)$ are input to the linear mapping defined by the coefficient $wS(1)ji$ (j=0 to ns1, i=0 to 7). That is, when m=1, 2, ..., αs is satisfied, the value of each node in the $m^{th}$ intermediate layer is generated by inputting, to the activation function hm, the output of the linear mapping defined by the coefficient $wS(m)$. Here, n1, n2, ..., nαs are the number of nodes in first, second, ... $αs^{th}$ intermediate layers. Here, $wS(1)j0$ and the like are bias parameters, and the input variable $x(0)$ is defined as "1".

Next, the CPU 72 generates input variables $x(1)$ to $x(7)$ of the mapping that outputs the third temperature Tcat3 (S20). Here, the input variables $x(1)$ to $x(5)$ are the same as those generated in the process of S12. The CPU 72 substitutes the previous value of the third temperature Tcat3 to the input variable $x(6)$, and substitutes the second temperature average value Tcat2ave to the input variable $x(7)$. The second temperature average value Tcat2ave is an average value of the most recent plurality of sampling values of the second temperature Tcat2, including the current value of the second temperature Tcat2, which is the second temperature Tcat2 calculated by the current process of S18.

Next, the CPU 72 calculates the third temperature Tcat3 by inputting the input variables $x(1)$ to $x(7)$ to the mapping that outputs the third temperature Tcat3 (S22). This mapping is formed by a neural network having an "at" number of intermediate layers, and in which the activation functions h1 to hαt of each intermediate layer are hyperbolic tangents, and the activation function f of the output layer is ReLU. For example, the value of each node in the first intermediate layer is generated by inputting, to the activation function h1, the output when the input variables x(1) to x(7) are input to the linear mapping defined by the coefficient wT(1)ji (j=0 to nt1, i=0 to 7). That is, if m=1, 2, . . . , at is satisfied, the value of each node in the $m^{th}$ intermediate layer is generated by inputting, to the activation function hm, the output of the linear mapping defined by the coefficient wT(m). Here, n1, n2, . . . , nαt are the number of nodes in the first, second, . . . , $αt^{th}$ intermediate layer. Here, wT(1)j0 and the like are bias parameters, and the input variable x(0) is defined as "1".

Next, the CPU 72 substitutes the second temperature Tcat2 presently calculated by the process of S18 to the catalyst temperature Tcat (S24) and then temporarily terminates the series of processes. When the process for FIG. 3 is initially executed, default values set in advance may be used as the previous value of the first temperature Tcat1, the previous value of the second temperature Tcat2, and the previous value of the third temperature Tcat3. Even if the default value is deviated from the actual temperature, the first temperature Tcat1, the second temperature Tcat2, and the third temperature Tcat3 respectively converge to the correct values by repeating the process for FIG. 3.

Figure 5:
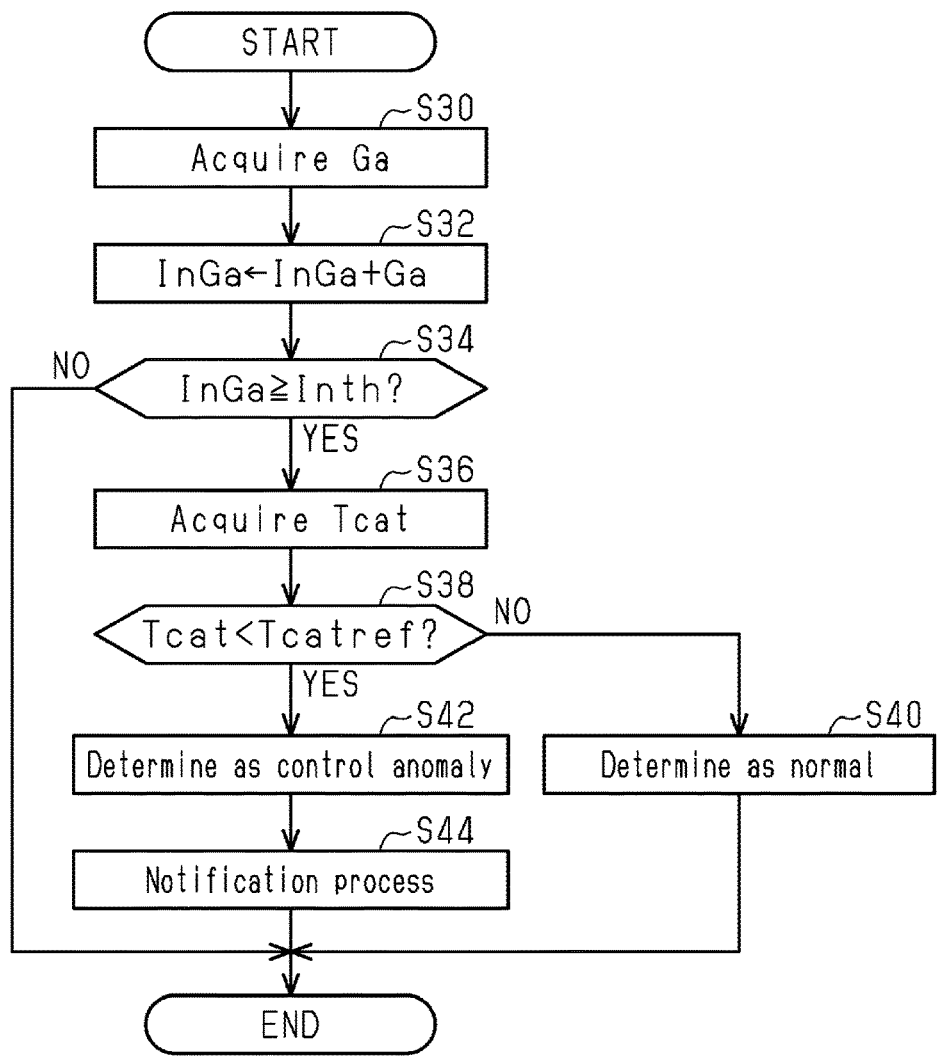
FIG. 5 is a flowchart showing a catalyst warm-up monitoring process according to the first embodiment.

FIG. 5 shows the warm-up process monitoring process for the catalyst 36 according to the present embodiment. The process shown in FIG. 5 is implemented by the CPU 72 repeatedly executing the monitoring process program 74b stored in the ROM 74 shown in FIG. 1 with the cold start of the internal combustion engine 10. The monitoring process program 74b is repeatedly executed, for example, in predetermined cycles until the determination of whether there is an anomaly.

In the series of processes shown in FIG. 5, the CPU 72 first acquires the intake air amount Ga (S30). Then, the CPU 72 updates the integrated value InGa by adding the intake air amount Ga acquired in the process of S30 to the integrated value InGa (S32). Then, the CPU 72 determines whether or not the integrated value InGa is greater than or equal to a predetermined value Inth (S34). Here, the predetermined value Inth is set to an allowable upper limit value for the temperature of the catalyst 36 to reach the reference temperature Tcatref if the warm-up control of the catalyst 36 is normally performed. That is, when the intake air amount Ga is large, the fuel injection amount is larger and the combustion energy generated in the combustion chamber 24 is also larger than when the intake air amount is small. Thus, the total amount of heat received by the catalyst 36 also increases. Therefore, it can be set as the allowable upper limit time for the catalyst 36 to reach the reference temperature Tcatref that the integrated value InGa reaches the predetermined value Inth. The reference temperature Tcatref is set according to the temperature at which the catalyst 36 becomes an activated state.

When determined that the integrated value InGa is greater than or equal to the predetermined value Inth (S34: YES), the CPU 72 acquires the catalyst temperature Tcat (S36). Then, the CPU 72 determines whether or not the catalyst temperature Tcat is lower than the reference temperature Tcatref (S38). This process is for determining whether an anomaly has occurred in the process shown in FIG. 2 and an anomaly has occurred in the warm-up control of the catalyst 36. Such anomaly determination monitors the operation amount of the operation unit set by the control device 70, that is, the presence or absence of an anomaly of the command itself from the control device 70. The presence or absence of anomaly in the warm-up control of the catalyst 36 is determined using the estimated value (Tcat) based on the operation amount for the warm-up process.

When determining that the catalyst temperature Tcat is higher than or equal to the reference temperature Tcatref (S38: NO), the CPU 72 makes a normal determination (S40). When determining that the catalyst temperature Tcat is lower than the reference temperature Tcatref (S38: YES), the CPU 72 determines that there is an anomaly in the warm-up control of the catalyst 36 (S42). Then, the CPU 72 executes a notification process for operating a warning lamp 98 shown in FIG. 1 to prompt the user to cope with the anomaly (S44).

When the processes of S40 and S44 are completed or when a negative determination is made in the process of S34, the CPU 72 temporarily terminates the series of processes shown in FIG. 5.

A method for generating the mapping data 76a will now be described.

Figure 6:
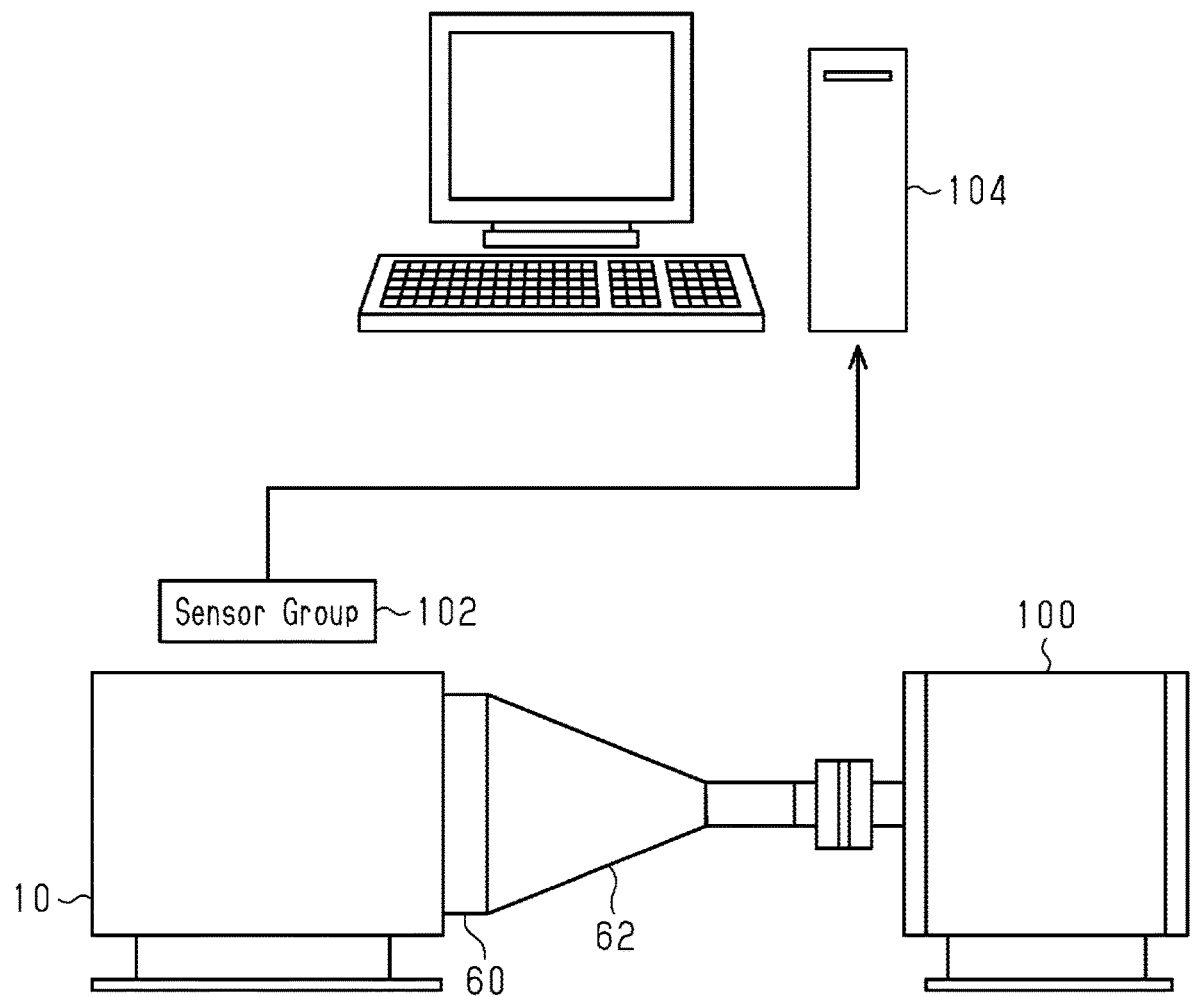
FIG. 6 is a diagram showing a system for generating mapping data according to the first embodiment.

FIG. 6 shows a system for generating the mapping data 76a.

As shown in FIG. 6, in the present embodiment, a dynamometer 100 is mechanically connected to the crankshaft 30 of the internal combustion engine 10 through a torque converter 60 and a transmission 62. Various state variables when the internal combustion engine 10 is operated are detected by the sensor group 102, and the detection results are input to an adaptation device 104, which is a computer that generates the mapping data 76a. The sensor group 102 includes an air flow meter 80 which is a sensor for detecting a value for generating an input to the mapping, a crank angle sensor 82, an intake side cam angle sensor 84, a coolant temperature sensor 88, and the like. Furthermore, the sensor group 102 includes temperature sensors that detect the temperatures of each of the first partial region A1, the second partial region A2, and the third partial region A3 of the catalyst 36.

Figure 7:
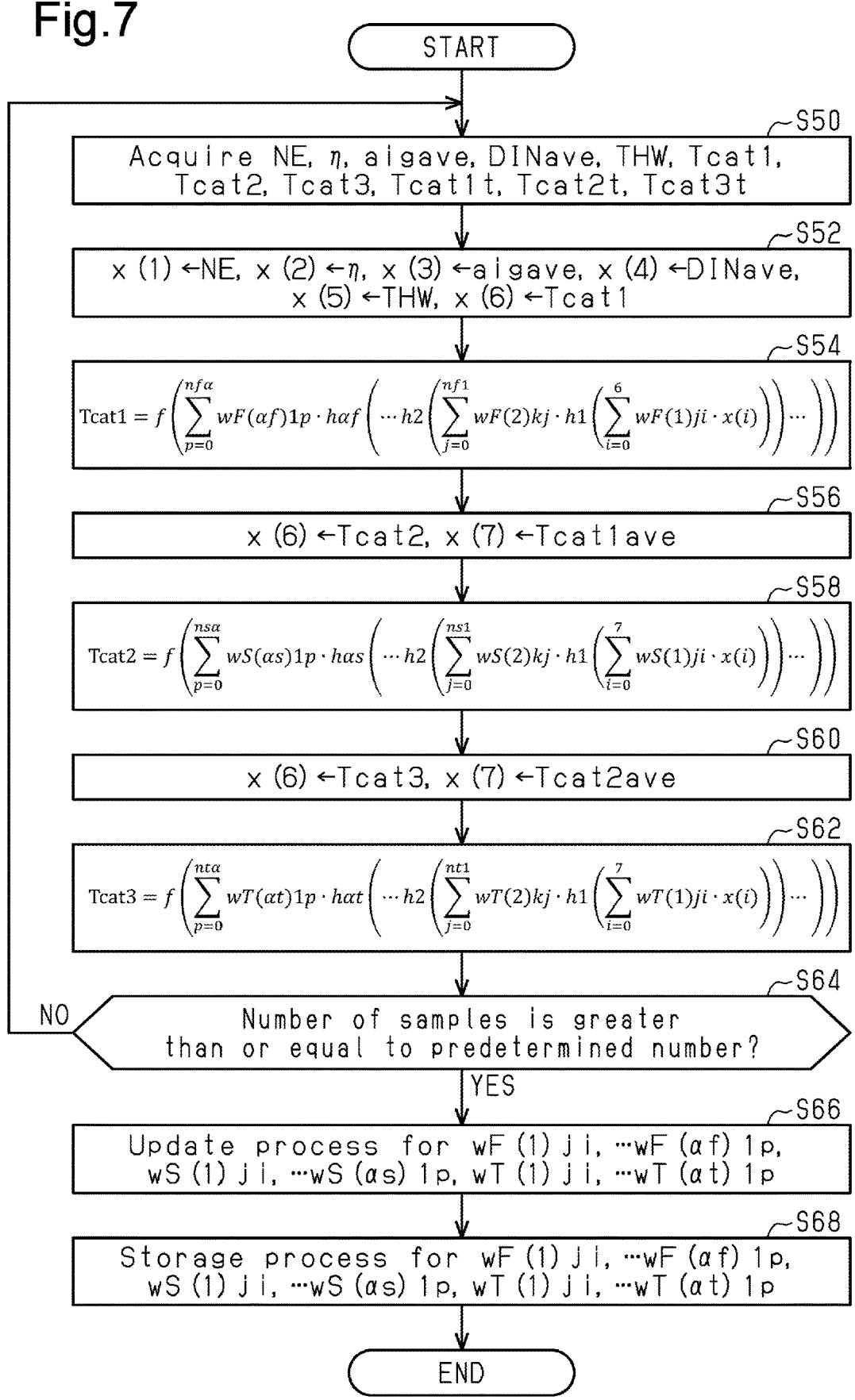
FIG. 7 is a flowchart showing a mapping data learning process according to the first embodiment.

FIG. 7 shows a mapping data generation process. The process shown in FIG. 7 is executed by the adaptation device 104. The process shown in FIG. 7 may be implemented by, for example, providing the adaptation device 104 with a CPU and a ROM, and executing a program stored in the ROM by the CPU.

In the series of processes shown in FIG. 7, the adaptation device 104 first acquires, as training data, the data same as that acquired in the process of S10 based on the detection result of the sensor group 102, and acquires the first temperature Tcat1t, the second temperature Tcat1t, and the third temperature Tcat3t, which are detection values of the temperature sensors, as teacher data of the supervised learning of the training data (S50). The last letter t of Tcat1t represents teacher data of the supervised learning.

Next, the adaptation device 104 executes the processes of S52 to S62, which are the processes similar to the processes of S12 to S22, using the training data other than teacher data of the supervised learning.

Then, the CPU 72 determines whether or not the number of samples of the first temperature Tcat1, the second temperature Tcat2, and the third temperature Tcat3 calculated in each of the processes of S54, S58, and S62 is greater than or equal to a predetermined value (S64). Here, in order for the number of samples to be greater than or equal to a predetermined value, it is required that the first temperature Tcat1, the second temperature Tcat2 and the third temperature Tcat3 are calculated at various action points defined by the rotation speed NE and the filling efficiency η by changing the operating state of the internal combustion engine 10.

When determining that the number of samples is not greater than or equal to the predetermined number (S64: NO), the adaptation device 104 returns to the process of S50. When determining that the number of samples is greater than or equal to the predetermined number (S64: YES), the adaptation device 104 updates coefficients wF(1)ji, ..., wF($\alpha$f)1p, coefficients wS(1)ji, ..., wS($\alpha$s)1p and coefficients wT(1)ji, wT($\alpha$t)1p (S66). Specifically, the adaptation device 104 updates the coefficient wF(1)ji, ..., wF($\alpha$f)1p so as to minimize the sum of squares of the difference between the first temperature Tcat1$t$ serving as the teacher data of the supervised learning and each of the first temperatures Tcat1 calculated by the process of S54. Furthermore, the adaptation device 104 updates the coefficient wS(1)ji, ..., wS($\alpha$s)1p so as to minimize the sum of squares of the difference between the second temperature Tcat2$t$ serving as the teacher data of the supervised learning and each of the second temperatures Tcat2 calculated by the process of S58. Moreover, the adaptation device 104 updates the coefficient wT(1)ji, ..., wT($\alpha$t)1p so as to minimize the sum of squares of the difference between the third temperature Tcat3$t$ serving as the teacher data of the supervised learning and each of the third temperatures Tcat3 calculated by the process of S62.

The adaptation device 104 stores the coefficients wF(1)ji, ..., wF($\alpha$f)1p, the coefficients wS(1)ji, ..., wS($\alpha$s)1p, and the coefficients wT(1)ji, ..., wT($\alpha$t)1p as learned mapping data 76$a$ (S68).

The operations and advantages of the present embodiment will now be described.

The CPU 72 estimates the catalyst temperature Tcat based on the ignition timing average value aigave, which is a variable related to the operation amount, the rotation speed NE, and the filling efficiency $\eta$, of the ignition device 28, which is the operation unit of the internal combustion engine 10 used in the warm-up process M42. Then, the CPU 72 determines that there is anomaly in the warm-up control when the catalyst temperature Tcat of when the integrated value InGa of the intake air amount Ga reached the predetermined value Inth is less than the reference temperature Tcatref. Here, the flow rate of the fluid flowing into the catalyst 36 is determined by the rotation speed NE and the filling efficiency $\eta$, and the temperature of the fluid flowing into the catalyst 36 can be recognized from the ignition timing aig. Thus, the catalyst temperature Tcat can be calculated with high accuracy. Therefore, the actual temperature of the catalyst 36 of when the integrated value InGa reached the predetermined value Inth can be expressed with high accuracy by the catalyst temperature Tcat. Therefore, when the catalyst temperature Tcat is less than the reference temperature Tcatref, the margin provided for the reference temperature Tcatref can be minimized in the process for anomaly determination. Furthermore, erroneous anomaly determinations can be reduced.

The present embodiment described above further has the advantages described below.

(1) The rotation speed NE and the filling efficiency $\eta$ forming the action point variable that defines the action point of the internal combustion engine 10 are included in the input of the mapping. The operation amount of the operation unit of the internal combustion engine 10 has a tendency to being variable in correspondence with the action point. Thus, the catalyst temperature Tcat can be calculated by reflecting the difference in the operation amount using the action point variable as an input of mapping.

(2) The intake phase difference average value DINave is included in the input to the mapping. Due to the intake phase difference DIN, the combustion temperature of the air-fuel mixture in the combustion chamber 24 changes, and consequently the temperature of the exhaust gas discharged to the exhaust passage 34 changes. Thus, the catalyst temperature Tcat can be calculated with higher accuracy by having the intake phase difference DIN as an input to the mapping. In particular, during a cold start, the target intake phase difference DIN* is not always unambiguously determined by the action point. Therefore, the catalyst temperature Tcat can be calculated with higher accuracy by including the intake phase difference DIN in addition to the rotation speed NE and the filling efficiency $\eta$ in the input to the mapping.

If the target intake phase difference DIN* were to be unambiguously determined by the rotation speed NE, the filling efficiency $\eta$, and the coolant temperature THW, by including the rotation speed NE, the filling efficiency $\eta$, and the coolant temperature THW in the input to the mapping, mapping data for calculating the catalyst temperature Tcat can be generated while reflecting the target intake phase difference DIN* by machine learning. In this case, however, the structure of mapping becomes complicated, for example, the number of intermediate layers of the neural network increases. By including the intake phase difference DIN in the input to the mapping as in the present embodiment, the catalyst temperature Tcat that reflects the influence of the intake phase difference DIN can be calculated with satisfactory accuracy while simplifying the structure of the mapping.

(3) Instead of inputting the ignition timing aig and the intake phase difference DIN to the mapping, the ignition timing average value aigave and the intake phase difference average value DINave, which are their average values, are input to the mapping. Thus, the information of the ignition timing aig and the intake phase difference DIN can be incorporated in the input to the mapping as much as possible without excessively shortening the processing cycle of the FIG. 3. Furthermore, the catalyst temperature Tcat can be calculated with higher accuracy.

(4) Various variables of the internal combustion engine 10 are randomly input in large quantities, and a mapping for calculating the catalyst temperature Tcat is not learned by machine learning. The variables that have a large effect on the change of the catalyst temperature Tcat were carefully selected. Therefore, compared with when not using knowledge of the inventors, the number of intermediate layers of the neural network and the dimension of the input variable can be reduced, and the structure of the mapping for calculating the catalyst temperature Tcat can be easily simplified.

(5) Instead of forming a single mapping that outputs the catalyst temperature Tcat, mappings that output the first temperature Tcat1, the second temperature Tcat2, and the third temperature Tcat3 were formed. Then, with "i=2,3", the $i^{th}$ temperature Tcati is estimated based on the "i-1"$^{th}$ temperature average value Tcat "i-1"ave, so that the $i^{th}$ temperature Tcati can be estimated in view of heat exchange between the $i^{th}$ partial region Ai and the "i-1"$^{th}$ partial region A "i-1". Therefore, for example, heat exchange between the partial regions of the catalyst 36 can be easily reflected as compared with when a mapping that outputs the catalyst temperature Tcat is formed by a single mapping. Thus, the estimation accuracy of the temperature can be enhanced while simplifying the structure of each mapping.

Second Embodiment

A second embodiment will now be described below with reference to FIGS. 8 and 9 focusing on differences from the first embodiment.

Figure 8:
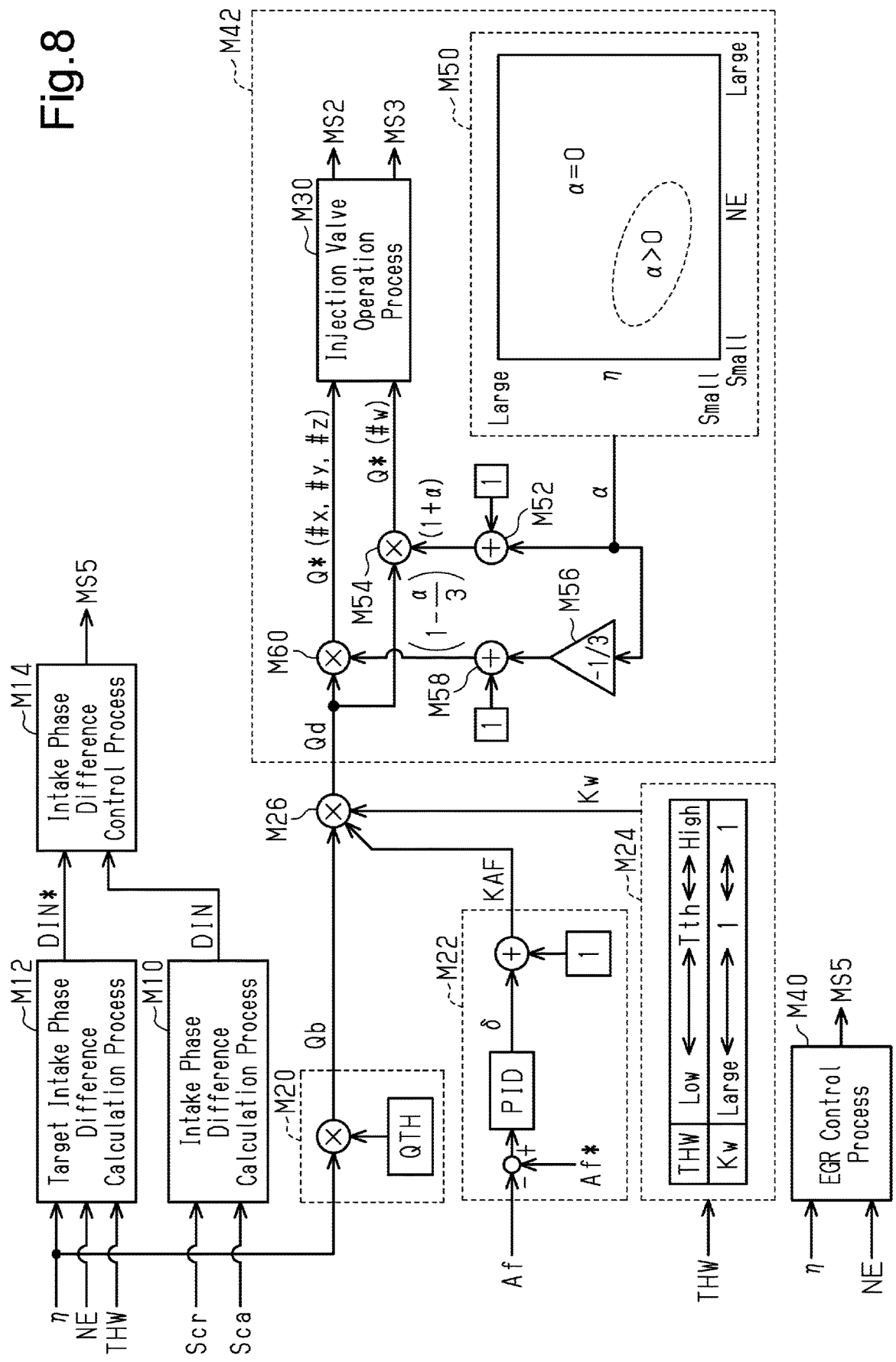
FIG. 8 is a block diagram showing part of a process executed by the control device according to a second embodiment.

FIG. 8 shows part of a process executed by the control device 70 according to the present embodiment. The process shown in FIG. 8 is implemented by the CPU 72 executing the program stored in the ROM 74. In FIG. 8, processes corresponding to the processes shown in FIG. 2 are denoted with the same reference numerals for the sake of convenience. In the following description, the internal combustion engine 10 has four cylinders #1 to #4.

An amplitude value variable output process M50 sets the target air-fuel ratio for the air-fuel ratio of all of the air-fuel mixture in cylinders #1 to #4, which is the combusted air-fuel mixture, during the period in which crankshaft 30 rotates twice. Furthermore, the amplitude value variable output process M50 is a process for calculating and outputting the amplitude value $\alpha$ of dither control in which the air-fuel ratio of the combusted air-fuel mixture is varied between the cylinders while setting such a target air-fuel ratio. Here, in the dither control according to the present embodiment, one of the first cylinder #1 to the fourth cylinder #4 is a rich combustion cylinder in which the air-fuel ratio of the air-fuel mixture is richer than the stoichiometric air-fuel ratio, and the remaining three cylinders are lean combustion cylinders in which the air-fuel ratio of the air-fuel mixture is leaner than the stoichiometric air-fuel ratio. Then, the injection amount in the rich combustion cylinder is set to "1+a" times the required injection amount Qd, and the injection amount in the lean combustion cylinder is set to "1−($\alpha$/3)" times the required injection amount Qd. Thus, if the amount of air each of the cylinders #1 to #4 is filled in in one combustion cycle is the same, the following two values (v) and (vi) are equal to each other.

Value (v): Sum (here, "$\alpha$" itself) for the number of appearances (here, once) in the combustion stroke of the rich combustion cylinder in the period in which the crankshaft rotates twice of the increase ratio (here, "$\alpha$") with respect to the required injection amount Qd in the rich combustion cylinder.

Value (vi): Sum (here, "$\alpha$" itself) for the number (here, three times) of the combustion stroke of the lean combustion cylinder in the period in which the crankshaft rotates twice of the decrease ratio (here, "$\alpha$/3") with respect to the required injection amount Qd in the lean combustion cylinder.

If the amount of air each of the cylinders #1 to #4 is filled with is the same in one combustion cycle when the value (v) and the value (vi) are equal to each other, the air-fuel ratio for all of the combusted air-fuel mixture in the cylinders #1 to #4 of the internal combustion engine 10 is the same as the target air-fuel ratio.

At the cold start of the internal combustion engine 10, a warm-up request is issued for the catalyst 36. Therefore, the amplitude value $\alpha$ is set to a value larger than zero by the amplitude value variable output process M50. Specifically, the amplitude value variable output process M50 includes a process for variably setting the amplitude value $\alpha$ based on the rotation speed NE and the filling efficiency $\eta$. Specifically, the amplitude value $\alpha$ is map calculated by the CPU 72 in a state in which the map data having the rotation speed NE and the filling efficiency $\eta$ as input variables and the amplitude value a as an output variable is stored in the ROM 74 in advance. FIG. 8 shows that the amplitude value $\alpha$ is zero in a region where the rotation speed NE and the filling efficiency $\eta$ are large. This is because, in a high load region or the like, the energy flow rate of the exhaust gas flowing into the catalyst 36 increases even if the dither control is not performed.

The map data is set data of a discrete value of the input variable and a value of the output variable corresponding to each value of the input variable. The map calculation may be, for example, a process for having the value of the output variable of the corresponding map data as a calculation result when the value of the input variable matches one of the values of the input variables of the map data, and having a value obtained by interpolation of the values of a plurality of output variables included in the map data as a calculation result when the value of the input variable does not match any of the values of the input variables of the map data.

A correction coefficient calculation process M52 is a process for calculating the correction coefficient of the required injection amount Qd for the rich combustion cylinder by adding the amplitude value $\alpha$ to "1". A dither correction process M54 is a process for calculating the injection amount command value Q* of the cylinder #w to be the rich combustion cylinder by multiplying the required injection amount Qd by the correction coefficient "1+$\alpha$". Here, "w" is any one of "1" to "4".

A multiplication process M56 is a process for multiplying the amplitude value $\alpha$ by "−⅓", and a correction coefficient calculation process M58 is a process for calculating the correction coefficient of the required injection amount Qd for the lean combustion cylinder by adding the output value of the multiplication process M56 to "1". A dither correction process M60 is a process for calculating an injection amount command value Q* of the cylinders #x, #y, #z to be the lean combustion cylinders by multiplying the required injection amount Qd by the correction coefficient "1−($\alpha$/3)". Here, "x", "y", "z" are any one of "1" to "4", and "w", "x", "y", "z" differ from one another.

An injection valve operation process M30 outputs the operation signals MS2, MS3 to the port injection valve 16 and the in-cylinder injection valve 26 of the cylinder #w to be the rich combustion cylinder based on the injection amount command value Q* output by the dither correction process M54. Thus, the total amount of fuel injected from the port injection valve 16 and the in-cylinder injection valve 26 is an amount corresponding to the injection amount command value Q*. Furthermore, the injection valve operation process M30 outputs the operation signals MS2, MS3 to the port injection valve 16 and the in-cylinder injection valve 26 of the cylinder #x, #y, #z to be the lean combustion cylinders based on the injection amount command value Q* output by the dither correction process M60. Thus, the total amount of fuel injected from the port injection valve 16 and the in-cylinder injection valve 26 is an amount corresponding to the injection amount command value Q*.

In the present embodiment, the warm-up process M42 is formed by the amplitude value variable output process M50, the correction coefficient calculation process M52, the dither correction process M54, the multiplication process M56, the correction coefficient calculation process M58, the dither correction process M60, and the injection valve operation process M30.

Figure 9:
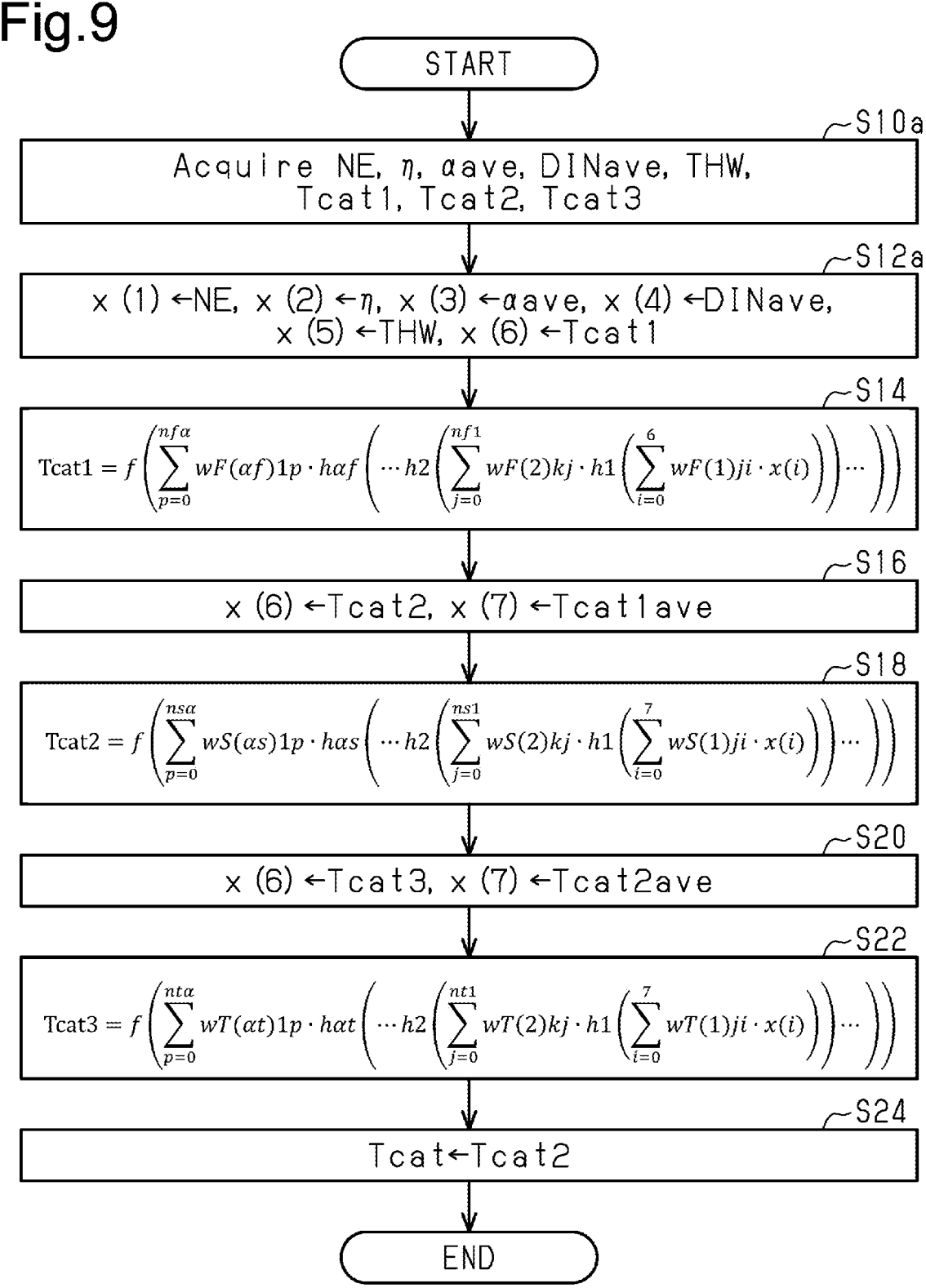
FIG. 9 is a flowchart showing a catalyst temperature estimation process according to the second embodiment.

FIG. 9 shows an estimation process for the temperature of the catalyst 36. The process shown in FIG. 9 is implemented by the CPU 72 repeatedly executing the temperature estimation program 74a stored in the ROM 74 shown in FIG. 1, for example, in predetermined cycles. In FIG. 9, processes corresponding to the processes shown in FIG. 3 are denoted with the same step numbers for the sake of convenience.

In the series of processes shown in FIG. 9, the CPU 72 first executes a process in which the acquisition of the ignition timing average value aigave is changed to the acquisition of the amplitude value average value cave with respect to the process of S10 (S10a). Here, the amplitude value average value αave is an average value of the amplitude value α in the processing cycle of S10a. Next, the CPU 72 executes a process in which the variable to be substituted for the input variable x(3) is changed from the ignition timing average value aigave to the amplitude value average value cave with respect to the process of S12 (S12a). Then, the CPU 72 executes the same processes as S16 to S24 in FIG. 3 although the input variable x(3) is changed.

Thus, in the present embodiment, the dither control is executed as the warm-up process M42. According to the dither control, the warm-up of the catalyst 36 is accelerated by the heat generated when the oxygen discharged from the lean combustion cylinder is stored in the catalyst 36 and the combustion of heat generated when the unburned fuel discharged from the rich combustion cylinder is oxidized by the oxygen stored in the catalyst 36. Thus, the temperature of the catalyst 36 can be calculated with high accuracy by including the amplitude value average value cave in the input of the mapping.

Third Embodiment

A third embodiment will now be described with reference to the FIG. 10 focusing on differences from the first embodiment.

Figure 10:
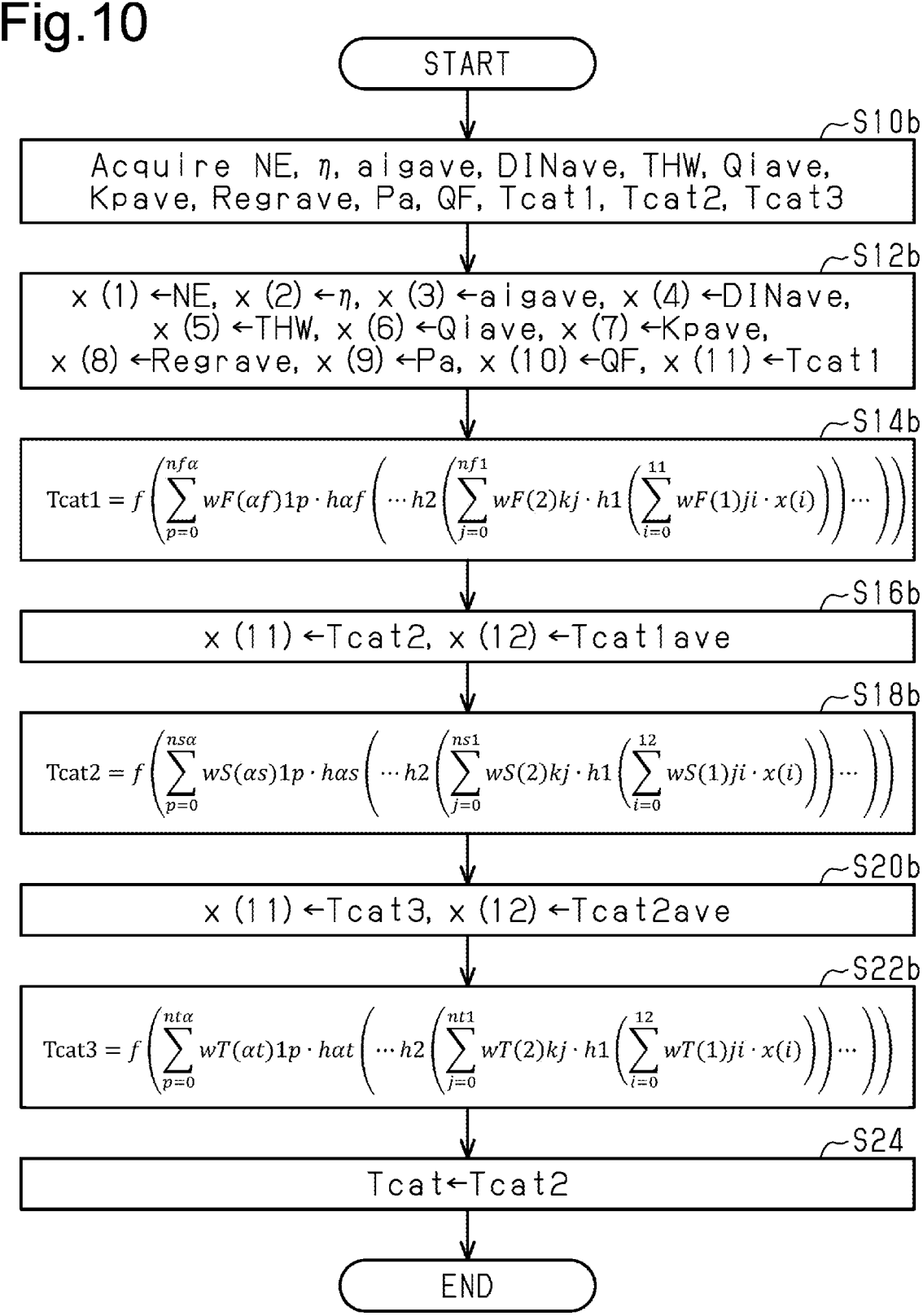
FIG. 10 is a flowchart showing a catalyst temperature estimation process according to a third embodiment.

FIG. 10 shows an estimation process for the temperature of the catalyst 36. The process shown in FIG. 10 is implemented by the CPU 72 repeatedly executing the temperature estimation program 74a stored in the ROM 74 shown in FIG. 1, for example, in predetermined cycles. In FIG. 10, processes corresponding to the processes shown in FIG. 3 are denoted with the same step numbers for the sake of convenience.

In the series of processing shown in FIG. 10, the CPU 72 first acquires, in addition to the variables acquired in the process of S10, the increase amount average value Qiave, the injection sharing ratio average value Kpave, the EGR ratio average value Regrave, the atmospheric pressure Pa, and the flow rate variable QF (S10b). Here, the increase amount average value Qiave, the injection sharing ratio average value Kpave, and the EGR ratio average value Regrave are the average values of the increase amount Qi, the injection sharing ratio Kp, and the EGR ratio Regr in the processing cycle of S10b. Furthermore, the increase amount Qi indicates an excess or deficiency with respect to the fuel amount necessary in having the air-fuel ratio of the air-fuel mixture to the stoichiometric air-fuel ratio. The flow rate variable QF is a variable indicating the flow rate of the coolant in the coolant circulation path 52, and is calculated by the CPU 72 according to the opening degree of the flow rate control valve 56.

Next, the CPU 72 generates input variables x(1) to x(5) in the same manner as the process of S12, and further generates input variables x(6) to x(11) (S12b). That is, the CPU 72 substitutes the increase amount average value Qiave to the input variable x(6), substitutes the injection sharing ratio average value Kpave to the input variable x(7), and substitutes the EGR ratio average value Regrave to the input variable x(8). Furthermore, the CPU 72 substitutes the atmospheric pressure Pa to the input variable x(9), substitutes the flow rate variable QF to the input variable x(10), and substitutes the previous value of the first temperature Tcat1 to the input variable x(11).

Next, the CPU 72 calculates the first temperature Tcat1 by inputting the input variables x(1) to x(11) to the mapping that outputs the first temperature Tcat1 (S14b). The mapping here is a neural network similar to that used in the process of S14, but the dimensions of the input variables are different.

Next, the CPU 72 generates input variables x(1) to x(12) of the mapping that outputs the second temperature Tcat2 (S16b). Here, the input variables x(1) to x(10) are the same as those generated in the process of S12b. The CPU 72 substitutes the previous value of the second temperature Tcat2 to the input variable x(11), and substitutes the first temperature average value Tcat1ave to the input variable x(12).

Next, the CPU 72 calculates the second temperature Tcat2 by inputting the input variables x(1) to x(12) to the mapping that outputs the second temperature Tcat2 (S18b). The mapping here is a neural network similar to that used in the process of S18, but the dimensions of the input variables are different.

Next, the CPU 72 generates input variables x(1) to x(12) of the mapping that outputs the third temperature Tcat3 (S20b). Here, the input variables x(1) to x(10) are the same as those generated in the process of S12b. The CPU 72 substitutes the previous value of the third temperature Tcat3 to the input variable x(11), and substitutes the second temperature average value Tcat2ave to the input variable x(12).

Next, the CPU 72 calculates the third temperature Tcat3 by inputting the input variables x(1) to x(12) to the mapping that outputs the third temperature Tcat3 (S22b). The mapping here is a neural network similar to that used in the process of S22, but the dimensions of the input variables are different.

Then, the CPU 72 proceeds to the process of S24.

The present embodiment has the advantages described below.

(6) The increase amount average value Qiave is included in the input to the mapping. For example, when the injection amount is set by the startup injection amount setting process M28, and the like, the injection amount is not determined depending on the action point of the internal combustion engine 10. Thus, for example, the injection amount cannot be recognized with high accuracy only by using the action point as an input. Furthermore, during a cold start, the low temperature increase coefficient Kw is a value larger than "1", so that the injection amount is not unambiguously determined depending on the action point of the internal combustion engine 10. Therefore, the injection amount cannot be recognized with high accuracy only by using the action point as an input. In the present embodiment, the injection amount can be recognized with high accuracy, and the catalyst temperature Tcat can be calculated with high accuracy by using the increase amount average value Qiave.

In the present embodiment, in principle, information on the injection amount that takes into account the influence of the low temperature increase coefficient Kw can be obtained with the rotation speed NE, the filling efficiency 11, and the coolant temperature THW. Nevertheless, when calculating the catalyst temperature Tcat in view of the influence of the low temperature increase coefficient Kw, there may be a concern that the structure of the mapping may easily become complicated, such as an increase in the number of intermediate layers. The structure of the mapping can be simplified while accurately calculating the catalyst temperature Tcat while grasping the influence of the low temperature increase coefficient Kw by using the increase amount average value Qiave.

(7) The injection sharing ratio average value Kpave is included in the input to the mapping. Thus, the catalyst temperature Tcat that reflects the difference in combustion between when the fuel is injected from the port injection valve 16 and when the fuel is injected from the in-cylinder injection valve 26 can be calculated.

(8) The EGR ratio average value Regrave is included in the input to the mapping. Thus, when the EGR ratio Regr is different, the combustion is different, and the catalyst temperature Tcat that reflects the difference in the temperature of the exhaust gas discharged to the exhaust passage 34 can be calculated.

(9) The atmospheric pressure Pa is included in the input to the mapping. Thus, the catalyst temperature Tcat that reflects the difference in combustion according to the atmospheric pressure Pa can be calculated.

(10) The flow rate variable QF is included in the input to the mapping. Thus, the temperature of the coolant changes according to the amount of heat exchange between the coolant and the temperature adjusting device 54, and, consequently, the catalyst temperature Tcat that reflects the change in the temperature of each part of the internal combustion engine 10 can be calculated.

Fourth Embodiment

A fourth embodiment will now be described below with reference to FIG. 11 focusing on differences from the first embodiment.

Figure 11:
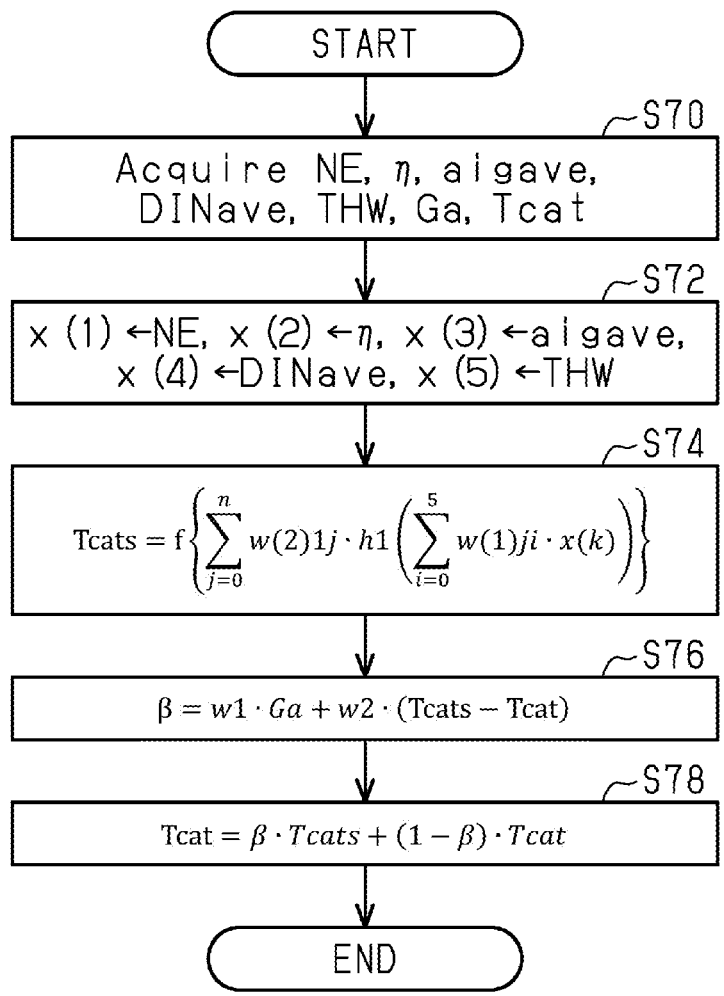
FIG. 11 is a flowchart showing a catalyst temperature estimation process according to a fourth embodiment.

FIG. 11 shows an estimation process for the temperature of the catalyst 36. The process shown in FIG. 11 is implemented by the CPU 72 repeatedly executing the temperature estimation program 74a stored in the ROM 74 shown in FIG. 1, for example, in predetermined cycles.

In the series of processes shown in FIG. 11, the CPU 72 first acquires the rotation speed NE, the filling efficiency $\eta$, the ignition timing average value aigave, the intake phase difference average value DINave, the coolant temperature THW, the intake air amount Ga, and the previous value of the catalyst temperature Tcat (S70). Then, the CPU 72 substitutes variables other than the previous value of the catalyst temperature Tcat among the variables acquired by the process of S70 for each of the input variables x(1) to x(5) (S72). Here, the input variables x(1) to x(5) are the same as those in the process of S12.

Next, the CPU 72 calculates the steady temperature Tcats by inputting the input variables x(1) to x(5) to the mapping that outputs the steady temperature Tcats (S74). Here, the steady temperature Tcats is a temperature of the catalyst 36 in a steady state such that the change amount of the action point variable of the internal combustion engine 10 is less than or equal to a specified value.

This mapping is formed by a neural network in which the intermediate layer is one layer, the activation function h1 of the intermediate layer is a hyperbolic tangent, and the activation function f of the output layer is ReLU. For example, the value of each node in the intermediate layer is generated by inputting, to the activation function h1, the output when the input variables x(1) to x(5) are input to the linear mapping defined by the coefficient w(1)ji(j=0 to n1, i=0 to 5). Here, wj0 and the like are bias parameters, and the input variable x(0) is defined as "1".

The mapping data defining the mapping may be generated, for example, based on training data when the internal combustion engine 10 is in steady operation at each of a plurality of action points.

Then, the CPU 72 calculates a time constant $\beta$ for the catalyst temperature Tcat to shift to the steady temperature Tcats based on a mapping formed by a linear regression equation having the intake air amount Ga and a value obtained by subtracting the catalyst temperature Tcat from the steady temperature Tcats as inputs (S76). For example, the linear regression equation may be obtained by measuring the behavior until the actual temperature shifts to the steady temperature, and learning the behavior as teacher data of the supervised learning.

Then, the CPU 72 updates the catalyst temperature Tcat by the sum of the value obtained by multiplying the steady temperature Tcats by the time constant $\beta$ and the value obtained by multiplying the previous value of the catalyst temperature Tcat by "1−$\beta$" (S78).

When the process of S78 is completed, the CPU 72 temporarily terminates the series of processes shown in FIG. 11.

As described above, in the present embodiment, the catalyst temperature Tcat is calculated using the mapping for calculating the steady temperature Tcats and the mapping for calculating the time constant $\beta$. The request with respect to each mapping can thus be reduced. Therefore, compared with a single mapping that outputs the catalyst temperature Tcat, for example, the temperature can be calculated with high accuracy while simplifying the structure of each mapping.

The present embodiment has the advantages described below.

(11) Instead of having the three parameters of the intake air amount Ga, the steady temperature Tcats, and the catalyst temperature Tcat as the input of the mapping that outputs the time constant $\beta$, two parameters of the intake air amount Ga and the value obtained by subtracting the catalyst temperature Tcat from the steady temperature Tcats are used as the input of the mapping. Here, knowledge of the inventors that the time constant $\beta$ corresponds to the difference between the steady temperature Tcats and the catalyst temperature Tcat is used. Thus, since the elements to be learned by machine learning can be reduced, the mapping is easily simplified.

Fifth Embodiment

A fifth embodiment will now be described with reference to FIG. 12 focusing on differences from the first embodiment.

In the present embodiment, the calculation process for the catalyst temperature Tcat is performed outside the vehicle.

Figure 12:
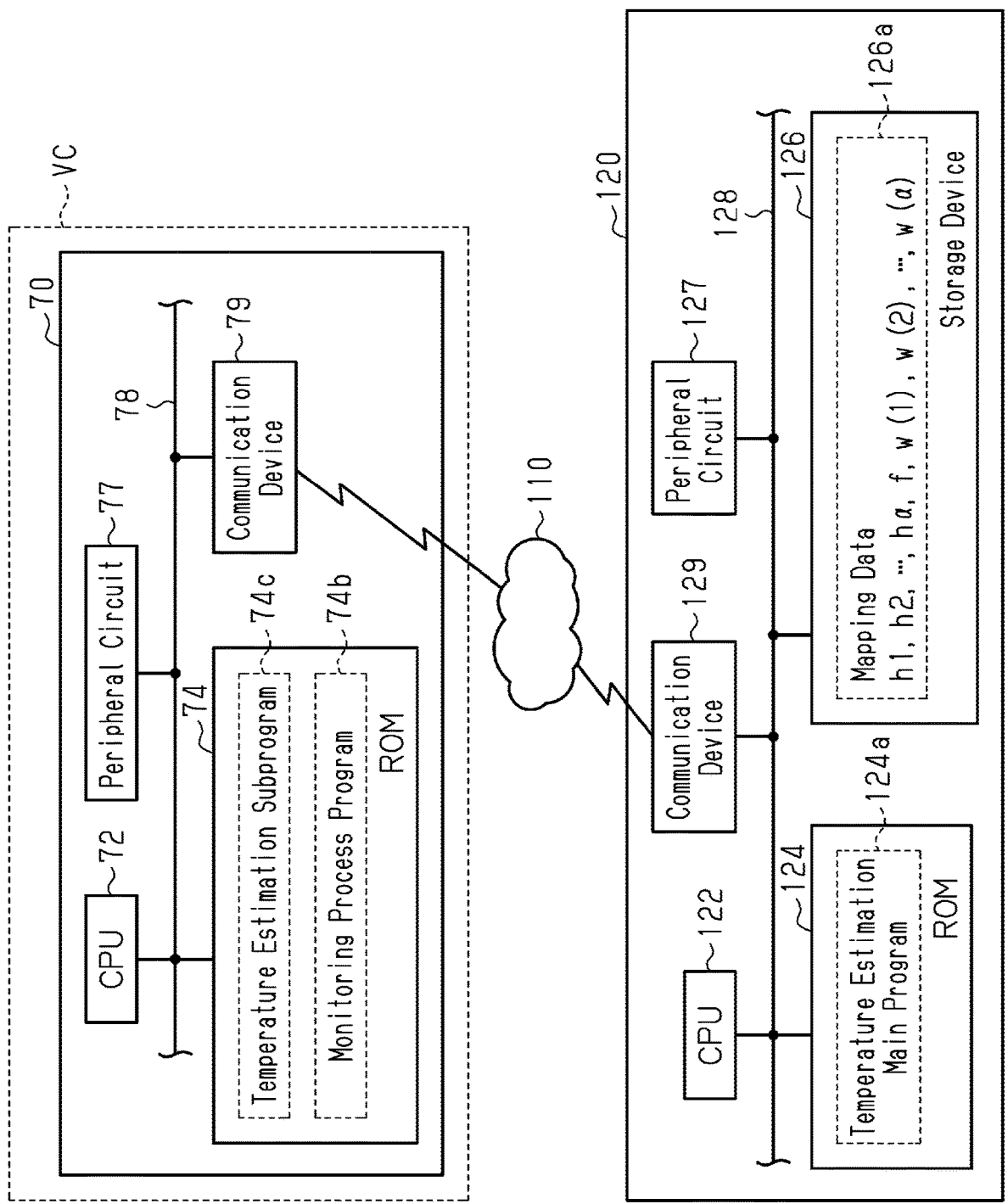
FIG. 12 is a flowchart showing a catalyst temperature estimation process according to a fifth embodiment.

FIG. 12 shows a catalyst warm-up process monitoring system according to the present embodiment. In FIG. 12, members corresponding to the members shown in FIG. 1 are denoted with the same reference numerals for the sake of convenience.

The control device 70 in the vehicle VC shown in FIG. 12 includes a communication device 79. The communication device 79 is a device for communicating with a center 120 via the network 110 outside the vehicle VC.

The center 120 analyzes data transmitted from the plurality of vehicles VC. The center 120 includes a CPU 122, a ROM 124, a storage device 126, a peripheral circuit 127, and a communication device 129, which can communicate with one another through a local network 128. The ROM 124 stores a temperature estimation main program 124a, and the storage device 126 stores mapping data 126a.

Figure 13:
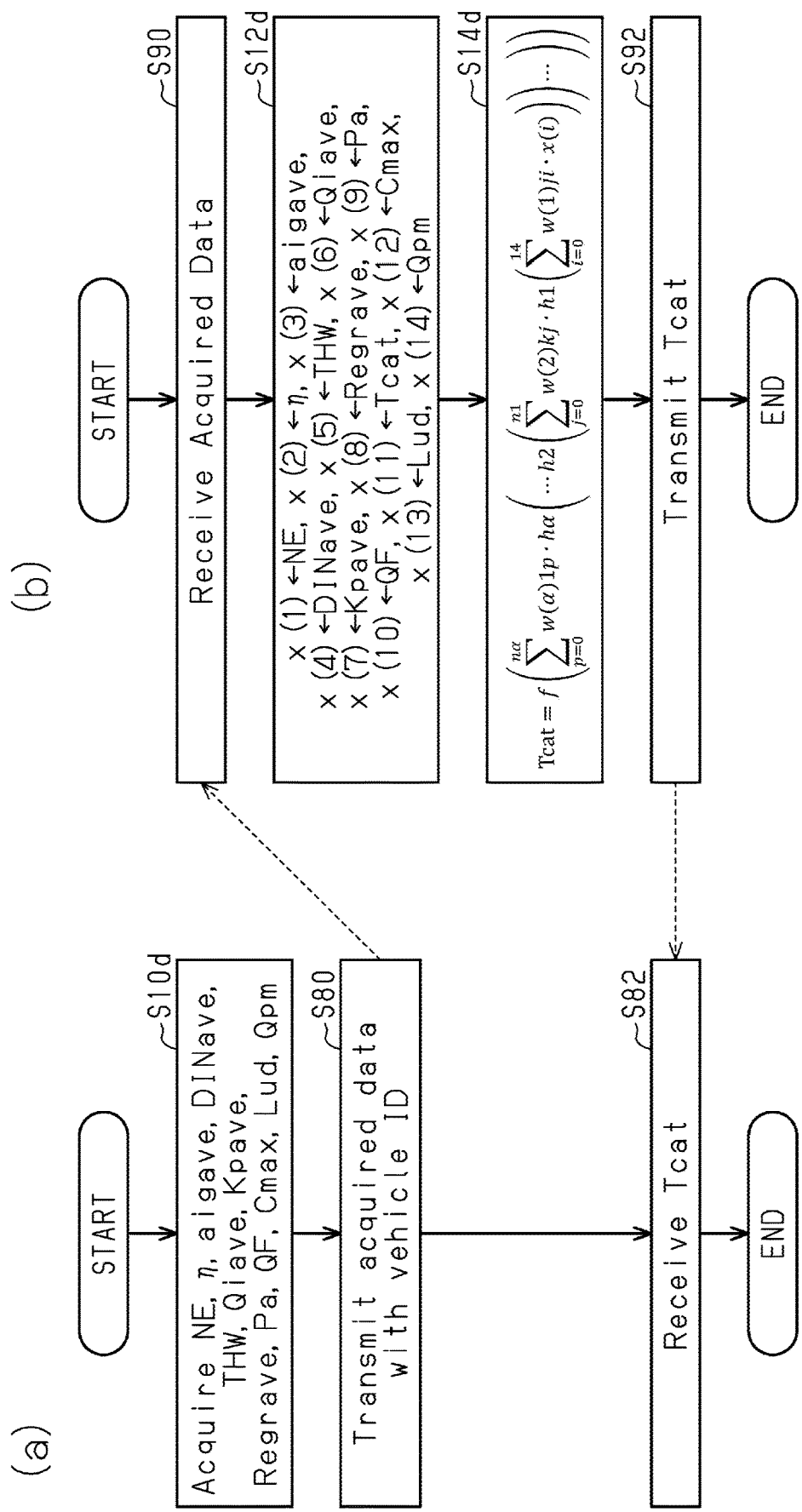
FIG. 13 is a flowchart including section (a) and section (b) and showing a process executed by the catalyst temperature estimation system of FIG. 12.

FIG. 13 includes a section (a) and a section (b) and shows procedures of a process executed by the system shown in FIG. 12. The process shown in section (a) in FIG. 13 is implemented by the CPU 72 executing the temperature estimation subprogram 74c stored in the ROM 74 shown in FIG. 12. Furthermore, the process shown in section (b) in FIG. 13 is implemented by the CPU 122 executing the temperature estimation main program 124a stored in the ROM 124. Hereinafter, the process shown in sections (a) and (b) in FIG. 13 will be described in order of time in the temperature estimation process.

As shown in section (a) in FIG. 13, in the vehicle VC, the CPU 72 first acquires several variables as inputs of the mapping in addition to the variables other than the previous value of the first temperature Tcat1, the previous value of the second temperature Tcat2, and the previous value of the third temperature Tcat3 among the variables acquired in the process of S10b (S10d). That is, the CPU 72 acquires the maximum value Cmax of the oxygen storage amount at the reference temperature, the length Lud from the upstream side to the downstream side of the catalyst 36, and the supported amount Qpm of noble metal of the catalyst 36 as specification variables which are variables indicating the specification among the state variables of the catalyst 36. This is a setting for calculating the temperature of the catalyst 36 of various specifications with one mapping data.

Next, the CPU 72 transmits the data acquired by the process of S10d to the center 120 together with the vehicle ID which is data indicating the identification information of the vehicle (S80).

The CPU 122 of the center 120 receives the transmitted data (S90) and substitutes the data acquired by the process of S90 to the input variable x of the mapping, as shown in section (b) in FIG. 13 (S12d). Here, the CPU 122 substitutes the same variables as those in the process of S12b to the input variables x(1) to x(10) Furthermore, the CPU 122 substitutes the previous value of the catalyst temperature Tcat to the input variable x(11), substitutes the maximum value Cmax to the input variable x(12), and substitutes the length Lud to the input variable x(13), and substitutes the supported amount Qpm to the input variable x(14).

Then, the CPU 122 calculates the catalyst temperature Tcat by inputting the input variables x(1) to x(14) generated in S12d to the mapping defined by the mapping data 126a (S14d). The mapping is formed by a neural network in which the number of intermediate layers is "α", the activation functions h1 to hα of each intermediate layer are hyperbolic tangents, and the activation function f of the output layer is ReLU. For example, the value of each node in the first intermediate layer is generated by inputting, to the activation function h1, the output when the input variables x(1) to x(14) are input to the linear mapping defined by the coefficient w(1)ji(j=0 to n1, i=0 to 14) That is, if m=1, 2, . . . , α is satisfied, the value of each node of the $m^{th}$ intermediate layer is generated by inputting, to the activation function hm, the output of the linear mapping defined by the coefficient w(m). Here, n1, n2, . . . , nα are the number of nodes in the first, second, . . . $α^{th}$ intermediate layer. Here, w(1)j0 and the like are bias parameters, and the input variable x(0) is defined as "1".

The CPU 122 operates the communication device 129 to transmit a signal related to the catalyst temperature Tcat to the vehicle VC that is the transmission source of the data received in the process of S90 (S92), and temporarily terminates the series of processes shown in section (b) in FIG. 13. As shown in section (a) in FIG. 13, the CPU 72 receives the catalyst temperature Tcat (S82), and temporarily terminates the series of processes shown in section (a) in FIG. 13.

Thus, according to the present embodiment, the calculation load on the control device 70 can be reduced by calculating the catalyst temperature Tcat at the center 120.

<Correspondence Relationship>

Correspondence relationship between the matters in the embodiment described above and the matters described in the section "Summary of the Invention" is as follows. Hereinafter, the correspondence relationship is shown for every number of the example described in the section "Summary of the Invention".

[1], [11] The catalyst corresponds to the catalyst 36. The execution device corresponds to the CPU 72 and the ROM 74. The warm-up operation amount variable corresponds to the ignition timing average value aigave and the amplitude value average value cave. The association data corresponds to data defining the processes of S30 to S42. The acquiring process corresponds to the processes of S10, S10a, S10b, and S70.

The temperature calculation process corresponds to the processes of S12 to S24, the processes of S12a, S14 to S24, the processes of S12b to S22b, S24, and the processes of S72 to S78. The determination process corresponds to the processes of S30 to S42. The coping process corresponds to the process of S44. The predetermined hardware corresponds to the warning lamp 98.

[2] The valve characteristic varying device corresponds to the variable valve timing device 44. The valve characteristic variable corresponds to the intake phase difference average value DINave.

[3] The ignition variable corresponds to the ignition timing average value aigave.

[4] The injection amount variable corresponds to the increase amount average value Qiave and the amplitude value average value cave.

[5] The amplitude value variable corresponds to the amplitude value average value cave.

[6] The injection sharing variable corresponds to the injection sharing ratio average value Kpave.

[7] The EGR variable corresponds to the EGR ratio average value Regrave.

[8] The atmospheric pressure variable corresponds to the atmospheric pressure Pa.

[9] The adjusting device corresponds to the flow rate control valve 56, and the flow rate variable corresponds to the flow rate variable QF.

[10] N corresponds to "3".

[11] The steady mapping corresponds to the mapping used in the process of S74. The air amount variable corresponds to the intake air amount Ga. The time constant calculation process corresponds to the process of S76.

[12] The catalyst warm-up process monitoring system corresponds to the control device 70 and the center 120. The first execution device corresponds to the CPU 72 and the ROM 74. The second execution device corresponds to the CPU 122 and the ROM 124. The acquiring process corresponds to the process of S10d, the vehicle-side transmitting process corresponds to the process of S80, and the vehicle-side receiving process corresponds to the process of S82. The external-side receiving process corresponds to the process of S90. The temperature calculation process corresponds to the processes of S12d and S14d. The external-side transmitting process corresponds to the process of S92.

[13] The data analysis device corresponds to the center 120.

[14] The control device for the internal combustion engine corresponds to the control device 70.

[15] The receiver may be configured by a portable information terminal adapted to execute application software for receiving information or an in-vehicle communication device. Such a receiver is hardware that forms a part of the catalyst warm-up process monitoring system and is configured to execute the vehicle-side receiving process S82.

Other Embodiments

The embodiments described above may be modified and implemented as described below. The present embodiment and the modified examples described below can be combined as long as there is technical consistency.

Regarding Ignition Variable

In the embodiment described above, the ignition timing average value aigave is exemplified as the ignition variable, but the ignition variable is not limited thereto. For example, the ignition timing aig may be an ignition variable.

Regarding Valve Characteristic Variable

In the embodiment described above, the intake phase difference average value DINave is used as the valve characteristic variable, but this is not the sole case, and for example, an average value of the target intake phase difference DIN* may be used. Furthermore, for example, a single sampling value of the intake phase difference DIN or the target intake phase difference DIN* may be used as the valve characteristic variable. In addition, as described below in the "Valve characteristic varying device" section, when a device having a variable lift amount is used as the valve characteristic variable device, the target value or the detection value of the lift amount and the like is set as the valve characteristic variable.

Regarding Injection Amount Variable

The excess amount variable, which is a variable that indicates the excess amount of the actual fuel amount with respect to the fuel amount that reacts with oxygen in the exhaust gas discharged to the exhaust passage 34 without excess or deficiency, is not limited to the increase amount average value Qiave and may be, for example, increase amount Qi itself. Furthermore, for example, the excess amount variable may be formed by the increase ratio obtained by dividing the increase amount Qi by the base injection amount Qb, the average value of the increase ratio, and the base injection amount Qb. Moreover, for example, the excess amount variable may be formed by the increase ratio, the average value of the increase ratio, the intake air amount Ga, and the rotation speed NE. In addition, for example, the excess amount variable may be formed by the increase ratio, the average value of the increase ratio, and the filling efficiency $\eta$.

The injection amount variable is not limited to the excess amount variable, and may be, for example, the required injection amount Qd or the average value of the required injection amount Qd.

Regarding Injection Sharing Variable

The injection sharing variable is not limited to the injection sharing ratio average value Kpave, and may be, for example, the injection sharing ratio Kp itself.

Regarding EGR Variable

The EGR variable is not limited to the EGR ratio average value Regrave and may be, for example, the EGR ratio Regr.

Regarding Amplitude Value Variable

The amplitude value variable is not limited to the amplitude value average value $\alpha$ave, and may be, for example, the amplitude value $\alpha$ itself. Furthermore, for example, the difference between the injection amount command value of the rich combustion cylinder and the injection amount command value of the lean combustion cylinder, or the average value of the difference may be used.

Regarding Warm-Up Operation Amount Variable

In the embodiment described above, the warm-up process is formed only by the dither control when the dither control is performed, but the present invention is not limited thereto. For example, the dither control may be performed and the ignition timing may be retarded by a predetermined amount from the normal time. In this case, the warm-up operation amount for the warm-up process is both the amplitude value $\alpha$ and the ignition timing aig.

Regarding Action Point Variable

The action point variable is not limited to the rotation speed NE and the filling efficiency $\eta$. For example, the intake air amount Ga and the rotation speed NE may be used. Instead of using the intake air amount Ga as an input to the mapping, the action point variable may not be used as the input to the mapping.

For example, instead of using the intake air amount Ga as an input to the mapping, the action point variable may not be used as an input to the mapping. For example, as described below in the "Regarding vehicle" section, even when the internal combustion engine 10 is mounted on a series hybrid vehicle and the internal combustion engine 10 is driven only at a predetermined action point, the action point variable does not have to be an input of the mapping.

Regarding Circulation Path and Adjusting Device

The circulation path is not limited to the circulation path for the coolant. For example, a circulation path for lubricating oil of the internal combustion engine 10 may be the circulation path. Furthermore, both the circulation path for the coolant and the circulation path for the lubricating oil may be the circulation paths.

Regarding Partial Region

In the above embodiments, the catalyst, of which the temperature is estimated, is divided into three partial regions. Instead, For example, the catalyst may be divided into two partial regions or, for example, four or more partial regions.

Regarding Input of Mapping (a) Regarding Input of Mapping for Every Partial Region The input of each mapping that outputs each of the first temperature to the $N^{th}$ temperature is not limited to including all of the variables exemplified by the process of S12.

Furthermore, for example, in the above embodiments, the first temperature average value Tcat1ave, which is the input of the mapping that outputs the second temperature Tcat2, is calculated including the current value of the first temperature Tcat1. However, there is no limit to such a configuration. Furthermore, instead of including the first temperature average value Tcat1ave in the input of the mapping that outputs the second temperature Tcat2, the current value, the previous value, and the like of the first temperature Tcat1, may be included. The input of the mapping that outputs the third temperature Tcat3 and the like can be changed in the same manner as the input of the mapping that outputs the second temperature Tcat2.

For example, an exhaust gas temperature sensor that detects the exhaust gas temperature may be arranged upstream of the catalyst 36, and the detection value may be included in the input of the mapping that outputs the first temperature Tcat1. For example, the time series data of the "i−1"$^{th}$ temperature Tcat "i−1" may be included in the input of the mapping that outputs the $i^{th}$ temperature Tcati, where "i" is an integer of 2 or more. Furthermore, for example, the detection value of the exhaust gas temperature and its average value may be included in the input of the mapping that outputs the $i^{th}$ temperature Tcati.

For example, as "i=1 to N−1", the "i+1"$^{th}$ temperature Tcat "i+l" may be included in the input to the mapping that outputs the i$^{th}$ temperature Tcati.

(b) Regarding Input of Mapping that Outputs Steady Temperature

The input of the mapping that outputs the steady temperature is not limited to every one of those exemplified in the process of S72.

(c) Regarding Input of Mapping Used by Center 120

In the process of S12*d*, *y* one of the exemplified input variables does not have to be the input variables. For example, one of the three parameters of the maximum value Cmax, the length Lud from the upstream side to the downstream side, and the supported amount Qpm may be included in the specification variable of the catalyst, and this may be used as the input variable. However, the specification variable does not have to be the input of the mapping.

(d) Regarding Input of Mapping Used in Vehicle VC

The input variables exemplified in the process of S12*d* that are not included in the input of the mapping used in the vehicle VC in the above embodiments may be included in the input of the mapping used in the vehicle VC.

(e) Others

For example, the vehicle speed SPD may be included in the input of the mapping.

For example, a storage amount variable which is a variable related to the oxygen storage amount in each partial region from the upstream side to the downstream side of the catalyst to be estimated may be included in the input of the mapping. The storage amount variable can be calculated, for example, by calculating an increase/decrease amount of the oxygen storage amount and updating the storage amount by the increase/decrease amount. The increase/decrease amount is first map calculated based on the air-fuel ratio Af and the intake air amount Ga for the most upstream region. Then, the increase/decrease amount of the oxygen storage amount in the downstream region adjacent to the most upstream region is map calculated based on the air-fuel ratio Af, the most upstream increase/decrease amount, and the intake air amount Ga. The increase/decrease amount in the downstream region adjacent to the most upstream region is map calculated based on the air-fuel ratio Af, the sum of the increase/decrease amounts in the most upstream region and the region adjacent thereto, and the intake air amount Ga. Hereinafter, similarly, the increase/decrease amount in the target region is map calculated based on the sum of all the increase/decrease amounts in the regions on the upstream side thereof, the air-fuel ratio Af, and the intake air amount Ga.

For example, as described below in "Regarding internal combustion engine" section, when the internal combustion engine 10 includes a supercharger, a bypass route through which exhaust gas flows to the catalyst 36 bypassing the supercharger, and a valve that adjusts the flow path cross-sectional area of the bypass route, the opening degree of the valve and the average value of the opening degree may be included in the input of the mapping. However, even when the internal combustion engine 10 includes a supercharger, the opening degree or the average value of the opening degree does not have to be included.

For example, instead of having a single sampling value of the warm-up operation amount variable such as the ignition timing average value aigave, and the like, the rotation speed NE, and the filling efficiency η as input to the mapping, the time series data thereof may be used as the input to the mapping.

Regarding Time Constant Mapping

The mapping that outputs the time constant β illustrated in FIG. 11 is not limited to that determined by the linear regression equation. For example, the output obtained by inputting the linear regression equation illustrated in FIG. 11 to a nonlinear function may be adopted as the time constant β. However, this is not the sole case, and for example, a neural network that outputs a time constant β may be used. Here, the input variable to the neural network may be the difference between the intake air amount Ga and the steady temperature Tcats and the catalyst temperature Tcat, but may include the intake air amount Ga, the steady temperature Tcats, and the catalyst temperature Tcat. Furthermore, it is not limited to including a learned model by machine learning, and for example, a mapping that outputs a time constant may be formed by map data.

Regarding Mapping Data

In the embodiment described above, the activation functions h1, h2, ... haf, h1, h2, ... has, h1, h2, ... hat, h1, h2, ... hα are hyperbolic tangents, and the activation function f is ReLU, but the present invention is not limited thereto. For example, the activation functions h1, h2, ... haf, h1, h2, ... has, h1, h2, ... hat, h1, h2, ... hα may be ReLU. Furthermore, for example, the activation functions h1, h2, ... haf, h1, h2, ... has, h1, h2, ... hat, h1, h2, ... hα may be logistic sigmoid functions. Moreover, for example, the activation function f may be a logistic sigmoid function, a hyperbolic tangent, an identity mapping, and the like.

The mapping data is not limited to data learned by machine learning. This can be realized, for example, by adapting the map data having the input variables x(1) to x(5) in the process of S72 as the input variables and the steady temperature Tcats as the output variable in the process for FIG. 11. However, the number of adaptations is easier to reduce by machine learning than by adapting map data.

In FIGS. 3, 9, 10, and 13, the intermediate layer of the neural network is described as having more than two layers, but this is not the sole case, and the intermediate layer may be one layer or two layers. In particular, as shown in FIGS. 3, 9, and 10, in a case where the temperature for each partial region of the catalyst 36 is calculated, the structure of each neural network is easily simplified while accurately calculating the catalyst temperature Tcat, and thus it is desirable to have two or less layers, and more desirable to have one layer.

Regarding Generation of Mapping Data

In the embodiment described above, the data when the internal combustion engine 10 is operated in a state where the dynamometer 100 is connected to the crankshaft 30 through the torque converter 60 and the transmission 62 is used as training data, but this is not the sole case. For example, data obtained when the internal combustion engine 10 is driven in a state where the internal combustion engine 10 is mounted on the vehicle VC may be used as training data.

Regarding Temperature Calculation Process

In the process of S24, the catalyst temperature Tcat is exemplified as the second temperature Tcat2. However, the catalyst temperature Tcat does not have to be the temperature of the central partial region of the partial regions from the upstream side to the downstream side of the catalyst 36. For example, the temperature of the partial region at the end on the upstream side of the catalyst 36 may be the catalyst temperature Tcat. Furthermore, for example, the average value of the temperatures of all the partial regions of the catalyst 36 may be the catalyst temperature Tcat, for example, the minimum value of the temperatures of all the partial regions may be the catalyst temperature Tcat, or for example, the maximum value of the temperatures of all the partial regions may be the catalyst temperature Tcat.

Regarding Coping Process

The notification process is not limited to operating a device that outputs visual information, such as the warning lamp 98, and for example, may be a process for operating a device that outputs audio information.

The coping process is not limited to the notification process. For example, a sensor for detecting the temperature of the exhaust gas flowing into the catalyst 36 may be provided, and when determined that there is an anomaly, feedback control may be performed so that the detection value of the sensor becomes higher than or equal to a predetermined temperature.

Regarding Data Analysis Device

When the catalyst temperature Tcat is calculated in the center 120, instead of the processes of S12d and 14d, for example, processes exemplified in the processes of S12 to S24, the processes of S12a, S14 to S24, the processes of S12b to S22b, S24, the processes of S72 to S78, and the modified examples thereof may be executed.

The process in section (b) in FIG. 13 may be executed by, for example, a mobile terminal owned by the user.

Regarding Execution Device The execution device is not limited to a device including the CPU 72 (122) and the ROM 74 (124) and executing the software process. For example, a dedicated hardware circuit (e.g., ASIC etc.) that hardware processes at least part of the software process executed in the above embodiment may be provided. In other words, the execution device only needs to have any one of following configurations (a) to (c). (a) A processing device that executes all of the above processes according to a program, and a program storage device (including a non-transitory computer-readable storage medium) such as a ROM that stores the program are provided. (b) A processing device and a program storage device that execute part of the above processes according to a program, and a dedicated hardware circuit that performs the remaining process are provided. (c) A dedicated hardware circuit that executes all of the above processes is provided. Here, the software execution device including the processing device and the program storage device or the dedicated hardware circuit may be provided in plurals.

Regarding Storage Device

In the embodiment described above, the storage device storing the mapping data 76a, 126a is a storage device different from the storage device (ROM 74, 124) storing the temperature estimation program 74a and the temperature estimation main program 124a, but this is not the sole case.

Regarding Valve Characteristic Varying Device

The valve characteristic varying device that changes the characteristic of the intake valve 18 is not limited to the variable valve timing device 44. For example, the device may change the lift amount of the intake valve 18. In this case, the parameter indicating the valve characteristic of the intake valve 18 is the lift amount or the like instead of the intake phase difference DIN.

Regarding Internal Combustion Engine

The internal combustion engine does not have to include a supercharger.

The internal combustion engine does not have to include both the port injection valve 16 and the in-cylinder injection valve 26 and may include only one of these two types of fuel injection valves.

The internal combustion engine does not have to configure the drive system. For example, the drive system may be configured in a so-called series hybrid vehicle in which a crankshaft is mechanically connected to an in-vehicle power generator and power is not transmitted from the engine to the drive wheels 64.

Regarding Vehicle

The vehicle is not limited to a vehicle in which the device that generates propulsive force of the vehicle is only an internal combustion engine, and for example, may be a parallel hybrid vehicle or a series/parallel hybrid vehicle, other than the series hybrid vehicle described in the "Regarding internal combustion engine" section.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst warm-up process monitoring device for an internal combustion engine, the catalyst warm-up process monitoring device comprising:

an execution device; and a storage device, wherein the catalyst warm-up process monitoring device is applied to an internal combustion engine in which a catalyst is arranged in an exhaust passage, the storage device is configured to store mapping data and association data, the mapping data defining a mapping that outputs an estimated value of a temperature of the catalyst using a warm-up operation amount variable and a previous value of an estimated value of a temperature of the catalyst as an input, the warm-up operation amount variable being a variable related to an operation amount of an operation unit of the internal combustion engine that is used for a warm-up process of the catalyst, and the association data associating an integrated value of an intake air amount of the internal combustion engine from the startup of the internal combustion engine and the temperature of the catalyst with each other, and the execution device is configured to execute:

the warm-up process;

an integrating process for calculating the integrated value;

an acquiring process for acquiring the warm-up operation amount variable and the previous value of the estimated value of the temperature of the catalyst;

a temperature calculation process for repeatedly calculating the estimated value of the temperature of the catalyst based on the output of the mapping in which the warm-up operation amount variable acquired by the acquiring process and the previous value are the input to the mapping;

a determination process for determining that the warm-up process has an anomaly when a correspondence relationship between the integrated value and the estimated value is different from a correspondence relationship between the integrated value and the temperature of the catalyst in the association data; and a coping process for coping with the anomaly by operating a predetermined hardware when determined that the anomaly has occurred.

2. The catalyst warm-up process monitoring device according to claim 1, wherein the internal combustion engine includes a valve characteristic varying device configured to vary the valve characteristic of an intake valve, the input to the mapping includes a valve characteristic variable that is a variable related to the valve characteristic, the acquiring process includes a process for acquiring the valve characteristic variable, and the temperature calculation process is a process for calculating the estimated value based on the output of the mapping in which the valve characteristic variable is further included in the input to the mapping.

3. The catalyst warm-up process monitoring device according to claim 1, wherein the warm-up operation amount variable includes an ignition variable that is a variable related to ignition timing.

4. The catalyst warm-up process monitoring device according to claim 3, wherein the input to the mapping includes an injection amount variable that is a variable related to a fuel injection amount, the acquiring process includes a process for acquiring the injection amount variable, and the temperature calculation process is a process for calculating the estimated value based on the output of the mapping in which the injection amount variable is further included in the input to the mapping.

5. The catalyst warm-up process monitoring device according to claim 1, wherein the warm-up process includes a dither control process for operating a fuel injection valve serving as the operation unit so that some of a plurality of cylinders of the internal combustion engine are set as rich combustion cylinders and cylinders differing from the some of a plurality of cylinders are set as lean combustion cylinders, wherein an air-fuel ratio in the rich combustion cylinder is richer than a stoichiometric air-fuel ratio, and an air-fuel ratio in the lean combustion cylinders is leaner than the stoichiometric air-fuel ratio, and the warm-up operation amount variable that is the input to the mapping includes an amplitude value variable, wherein the amplitude value variable is a variable related to an enrichment degree of the air-fuel ratio of the rich combustion cylinder with respect to the stoichiometric air-fuel ratio and a leaning degree of the air-fuel ratio of the lean combustion cylinder with respect to the stoichiometric air-fuel ratio.

6. The catalyst warm-up process monitoring device according to claim 1, wherein the internal combustion engine includes a port injection valve that injects fuel into an intake passage and an in-cylinder injection valve that injects fuel into a combustion chamber of the internal combustion engine, the input to the mapping includes an injection sharing variable that is a variable related to an injection sharing ratio, wherein the injection sharing ratio is a ratio of the amount of fuel injected from the port injection valve to the sum of the amount of fuel injected from the port injection valve and the amount of fuel injected from the in-cylinder injection valve, the acquiring process includes a process for acquiring the injection sharing variable, and the temperature calculation process is a process for calculating the estimated value based on the output of the mapping in which the injection sharing variable is further included in the input to the mapping.

7. The catalyst warm-up process monitoring device according to claim 1, wherein the internal combustion engine includes:

an EGR passage configured to cause a fluid entering the exhaust passage from the combustion chamber of the internal combustion engine to flow into the intake passage; and an EGR valve configured to adjust a flow path cross-sectional area of the EGR passage, the input to the mapping includes an EGR variable that is a variable indicating an EGR ratio, wherein the EGR ratio is a ratio of the amount of the fluid entering the intake passage through the EGR passage to the sum of the amount of air drawn into the intake passage and the amount of the fluid entering the intake passage through the EGR passage, the acquiring process includes a process for acquiring the EGR variable, and the temperature calculation process is a process for calculating the estimated value based on the output of the mapping in which the EGR variable is further included in the input to the mapping.

8. The catalyst warm-up process monitoring device according to claim 1, wherein the input to the mapping includes an atmospheric pressure variable that is a variable related to atmospheric pressure, the acquiring process includes a process for acquiring the atmospheric pressure variable, and the temperature calculation process is a process for calculating the estimated value based on the output of the mapping in which the atmospheric pressure variable is further included in the input to the mapping.

9. The catalyst warm-up process monitoring device according to claim 1, wherein liquid, of which flow rate is adjusted by an adjusting device, flows to the internal combustion engine, the input to the mapping includes a flow rate variable that is a variable related to the flow rate of the liquid, the acquiring process includes a process for acquiring the flow rate variable, and the temperature calculation process is a process for calculating the estimated value based on the output of the mapping in which the flow rate variable is further included in the input to the mapping.

10. The catalyst warm-up process monitoring device according to claim 1, wherein the catalyst is divided into N partial regions arranged in a flow direction of the fluid flowing into the catalyst, wherein the N partial regions include a first partial region to an Nth partial region in order from an upstream side of the catalyst, the acquiring process includes a process for acquiring a previous value of an estimated value of each temperature from the first partial region to the $N^{th}$ partial region as the previous value of the estimated value, the mapping includes a first mapping and an $i^{th}$ mapping as a mapping that outputs the estimated value of the temperature of the first partial region, wherein among the variables acquired by the acquiring process, the first mapping uses a variable other than an estimated value of a temperature of the partial region located downstream of the first partial region at least as the input, where "i" is an integer greater than or equal to 2 and less than or equal to N, the $i^{th}$ mapping is a mapping that outputs the estimated value of the temperature of the $i^{th}$ partial region and at least the estimated value of a temperature of an "i-1"$^{th}$ partial region and a previous value of an estimated value of the temperature of the $i^{th}$ partial region are used as the inputs to the $i^{th}$ mapping, the temperature calculation process includes a process for calculating an estimated value of each temperature from the first partial region to the $N^{th}$ partial region performed through a process for calculating the estimated value of the temperature of the first partial region by inputting to at least the first mapping a variable other than the estimated value of the temperature of the partial region located downstream of the first partial region among the variables acquired by the acquiring process, and a process for calculating the estimated value of the temperature of the $i^{th}$ partial region by using at least the estimated value of the temperature of the "i-1"$^{th}$ partial region and the previous value of the estimated value of the temperature of the $i^{th}$ partial region as the input to the $i^{th}$ mapping.

11. The catalyst warm-up process monitoring device according to claim 1, wherein the mapping includes a steady mapping and a time constant mapping, the steady mapping uses the warm-up operation amount variable as the input and outputs a steady temperature that is a value at which the temperature of the catalyst converges when the internal combustion engine is performing a steady operation, the time constant mapping uses an air amount variable, the steady temperature, and the previous value of the estimated value as an input, and outputs a time constant variable, wherein the air amount variable is a variable related to the intake air amount of the internal combustion engine, and the time constant variable is a variable defining a time constant for the current temperature to converge to the steady temperature, the acquiring process includes a process for acquiring the air amount variable, the temperature calculation process includes:

a steady calculation process that uses the warm-up operation amount variable as the input and calculates the steady temperature based on the output of the steady mapping;

a time constant calculation process that uses the air amount variable, the steady temperature, and the previous value of the estimated value as the input and calculates the time constant variable based on the output of the time constant mapping; and a process that calculates the estimated value by approximating the estimated value of the temperature of the catalyst to the steady temperature in correspondence with the time constant variable calculated by the time constant calculation process.

12. The catalyst warm-up process monitoring device according to claim 1, wherein the coping process includes a notification process for issuing a notification that the warm-up process has an anomaly by operating a notification device as the predetermined hardware.

13. A catalyst warm-up process monitoring system for an internal combustion engine, the catalyst warm-up process monitoring system comprising:

an execution device; and a storage device, wherein the catalyst warm-up process monitoring device is applied to an internal combustion engine in which a catalyst is arranged in an exhaust passage, the storage device is configured to store mapping data and association data, the mapping data defining a mapping that outputs an estimated value of a temperature of the catalyst using a warm-up operation amount variable and a previous value of an estimated value of a temperature of the catalyst as an input, the warm-up operation amount variable being a variable related to an operation amount of an operation unit of the internal combustion engine that is used for a warm-up process of the catalyst, and the association data associating an integrated value of an intake air amount of the internal combustion engine from the startup of the internal combustion engine and the temperature of the catalyst with each other, and the execution device is configured to execute:

the warm-up process;

an integrating process for calculating the integrated value;

an acquiring process for acquiring the warm-up operation amount variable and the previous value of the estimated value of the temperature of the catalyst;

a temperature calculation process for repeatedly calculating the estimated value of the temperature of the catalyst based on the output of the mapping in which the warm-up operation amount variable acquired by the acquiring process and the previous value are the input to the mapping;

a determination process for determining that the warm-up process has an anomaly when a correspondence relationship between the integrated value and the estimated value is different from a correspondence relationship between the integrated value and the temperature of the catalyst in the association data; and a coping process for coping with the anomaly by operating a predetermined hardware when determined that the anomaly has occurred, wherein the execution device includes a first execution device and a second execution device, the first execution device is mounted on a vehicle and configured to execute:

the acquiring process;

a vehicle-side transmitting process for transmitting data acquired by the acquiring process to outside the vehicle;

a vehicle-side receiving process for receiving a signal based on the estimated value calculated by the temperature calculation process; and the coping process, and the second execution device is disposed outside the vehicle and configured to execute:

an external-side receiving process for receiving the data transmitted by the vehicle-side transmitting process;

the temperature calculation process; and an external-side transmitting process for transmitting a signal based on the estimated value calculated by the temperature calculation process to the vehicle.

14. A data analysis device, comprising:
a second execution device; and
a storage device, wherein
a first execution device, the second execution device, and the storage device configure a catalyst warm-up process monitoring system for an internal combustion engine,
the catalyst warm-up process monitoring system is applied to an internal combustion engine in which a catalyst is arranged in an exhaust passage,
the storage device is configured to store mapping data and association data, the mapping data defining a mapping that outputs an estimated value of a temperature of the catalyst using a warm-up operation amount variable and a previous value of an estimated value of a temperature of the catalyst as an input, the warm-up operation amount variable being a variable related to an operation amount of an operation unit of the internal combustion engine that is used for a warm-up process of the catalyst, and the association data associating an integrated value of an intake air amount of the internal combustion engine from the startup of the internal combustion engine and the temperature of the catalyst with each other, and
the first execution device and the second execution device are configured to execute:
the warm-up process;
an integrating process for calculating the integrated value;
an acquiring process for acquiring the warm-up operation amount variable and the previous value of the estimated value of the temperature of the catalyst
a temperature calculation process for repeatedly calculating the estimated value of the temperature of the catalyst based on the output of the mapping in which the warm-up operation amount variable acquired by the acquiring process and the previous value are the input to the mapping;
a determination process for determining that the warm-up process has an anomaly when a correspondence relationship between the integrated value and the estimated value is different from a correspondence relationship between the integrated value and the temperature of the catalyst in the association data; and
a coping process for coping with the anomaly by operating a predetermined hardware when determined that the anomaly has occurred,
the first execution device is mounted on a vehicle and configured to execute:
the acquiring process;
a vehicle-side transmitting process for transmitting data acquired by the acquiring process to outside the vehicle;
a vehicle-side receiving process for receiving a signal based on the estimated value calculated by the temperature calculation process; and
the coping process, and the second execution device is disposed outside the vehicle and configured to execute:
an external-side receiving process for receiving the data transmitted by the vehicle-side transmitting process;
the temperature calculation process; and
an external-side transmitting process for transmitting a signal based on the estimated value calculated by the temperature calculation process to the vehicle.

15. A control device for an internal combustion engine, the control device comprising:
a first execution device, wherein
the first execution device, a second execution device, and a storage device configure a catalyst warm-up process monitoring system for an internal combustion engine,
the catalyst warm-up process monitoring system is applied to an internal combustion engine in which a catalyst is arranged in an exhaust passage,
the storage device is configured to store mapping data and association data, the mapping data defining a mapping that outputs an estimated value of a temperature of the catalyst using a warm-up operation amount variable and a previous value of an estimated value of a temperature of the catalyst as an input, the warm-up operation amount variable being a variable related to an operation amount of an operation unit of the internal combustion engine that is used for a warm-up process of the catalyst, and the association data associating an integrated value of an intake air amount of the internal combustion engine from the startup of the internal combustion engine and the temperature of the catalyst with each other, and
the first execution device and the second execution device are configured to execute:
the warm-up process;
an integrating process for calculating the integrated value;
an acquiring process for acquiring the warm-up operation amount variable and the previous value of the estimated value of the temperature of the catalyst a temperature calculation process for repeatedly calculating the estimated value of the temperature of the catalyst based on the output of the mapping in which the warm-up operation amount variable acquired by the acquiring process and the previous value are the input to the mapping;
a determination process for determining that the warm-up process has an anomaly when a correspondence relationship between the integrated value and the estimated value is different from a correspondence relationship between the integrated value and the temperature of the catalyst in the association data; and
a coping process for coping with the anomaly by operating a predetermined hardware when determined that the anomaly has occurred,
the first execution device is mounted on a vehicle and configured to execute:
the acquiring process;
a vehicle-side transmitting process for transmitting data acquired by the acquiring process to outside the vehicle;
a vehicle-side receiving process for receiving a signal based on the estimated value calculated by the temperature calculation process; and
the coping process, and
the second execution device is disposed outside the vehicle and configured to execute:
an external-side receiving process for receiving the data transmitted by the vehicle-side transmitting process;
the temperature calculation process; and
an external-side transmitting process for transmitting a signal based on the estimated value calculated by the temperature calculation process to the vehicle.

16. A method for monitoring a catalyst warm-up process for an internal combustion engine executed by an execution device and a storage device, wherein the method is applied to an internal combustion engine including a catalyst disposed in an exhaust passage, the method comprising:

storing mapping data and association data with the storage device, the mapping data defining a mapping that outputs an estimated value of a temperature of the catalyst using a warm-up operation amount variable and a previous value of an estimated value of a temperature of the catalyst as an inputs, the warm-up operation amount variable being a variable related to an operation amount of an operation unit of the internal combustion engine that is used for a warm-up process of the catalyst, and the association data associating an integrated value of an intake air amount of the internal combustion engine from the startup of the internal combustion engine and the temperature of the catalyst with each other;

calculating the integrated value with the execution device;

acquiring the warm-up operation amount variable, and the previous value of the estimated value of the temperature of the catalyst;

repeatedly calculating the estimated value of the temperature of the catalyst based on the output of the mapping using the acquired warm-up operation amount variable and the previous value as the input to the mapping;

determining that the warm-up process has an anomaly when a correspondence relationship between the integrated value and the estimated value is different from a correspondence relationship between the integrated value and the temperature of the catalyst in the association data; and coping with the anomaly by operating a predetermined hardware when determined that the anomaly has occurred.

* * * * *